US012693895B1

(12) United States Patent
Sinha et al.

(10) Patent No.: US 12,693,895 B1
(45) Date of Patent: Jul. 28, 2026

(54) DYNAMIC ELECTRONIC DATA GENERATION THROUGH HUMAN-GUIDED MULTI-AGENT COLLABORATION

(71) Applicant: Genpact USA, Inc., New York, NY (US)

(72) Inventors: Ayush Sinha, Bangalore (IN);
Chinmay Prakash, Bangalore (IN);
Prakash Selvakumar, Bangalore (IN);
Sreekanth Menon, Bangalore (IN)

(73) Assignee: Genpact USA, Inc., New York, NY (US)

( * ) Notice: Subject to any disclaimer, the term of this patent is extended or adjusted under 35 U.S.C. 154(b) by 0 days.

(21) Appl. No.: 19/353,228

(22) Filed: Oct. 8, 2025

(51) Int. Cl.
| | |
|---|---|
| *G06F 9/46* | (2006.01) |
| *G06F 9/48* | (2006.01) |
| *G06F 16/3332* | (2025.01) |
| *G06F 18/21* | (2023.01) |
| *G06F 18/214* | (2023.01) |
| *G06N 3/0475* | (2023.01) |

(52) U.S. Cl.
CPC ........ *G06F 9/4881* (2013.01); *G06F 16/3334* (2019.01); *G06F 18/2148* (2023.01); *G06F 18/2178* (2023.01); *G06F 18/2193* (2023.01); *G06N 3/0475* (2023.01)

(58) Field of Classification Search
CPC ............... G06F 9/4881; G06F 16/3334; G06F 18/2178; G06F 18/2148; G06F 18/2193; G06N 3/0475
See application file for complete search history.

(56) References Cited

U.S. PATENT DOCUMENTS

| | | |
|---|---|---|
| 11,508,360 B2 | 11/2022 | Peng et al. |
| 12,086,561 B2 | 9/2024 | Mittal et al. |
| 2022/0215141 A1 | 7/2022 | Gutierrez et al. |

(Continued)

OTHER PUBLICATIONS

Momha, M., The Synthetic Mirror—Synthetic Data at the Age of Agentic AI, arXiv:2506.13818v1, (2025).

(Continued)

*Primary Examiner* — Tammy E Lee
(74) *Attorney, Agent, or Firm* — Foley & Lardner LLP

(57) ABSTRACT

A multi-agent framework for generating synthetic data includes a human-in-the-loop agent that receives schema definitions, optional seed data, and domain-specific context, and transforms such inputs into a structured schema JSON; and an orchestrator agent that decomposes electronic data generation into subtasks and invokes autonomous agents including a topic modelling agent, an input enrichment agent, a variability injection agent, and a data generation agent. The topic modelling agent employs a large language model with an extended context window to extract hierarchical categories and salient keywords. The input enrichment agent expands categories using retrieval, keyword expansion, and iterative refinement, while the variability injection agent produces structured variation artifacts simulating real-world irregularities. The data generation agent synthesizes multimodal datasets that are persisted by an artifact serializer/loader and validated by a validation tool for coverage, schema conformity, and distributional balance. The synthetic dataset is suitable for training and validating machine learning models.

19 Claims, 8 Drawing Sheets

(56)     References Cited

U.S. PATENT DOCUMENTS

| | | | |
|---|---|---|---|
| 2024/0104168 A1 | 3/2024 | Lara et al. | |
| 2025/0131028 A1 | 4/2025 | Siebel et al. | |
| 2025/0384354 A1* | 12/2025 | Cresswell | .............. G06N 20/00 |
| 2026/0004080 A1* | 1/2026 | Varshney | ................ G06F 40/30 |

OTHER PUBLICATIONS

Nadas, M. et al., Synthetic Data Generation Using Large Language Models: Advances in Text and Code, arXiv:2503.14023v2, (2025).

Jimenez-Romero, C. et al., Multi-Agent Systems Powered by Large Language Models: Applications in Swarm Intelligence, arXiv:2503.03800v1, (2025).

Wu, Q. et al., AutoGen: Enabling Next-Gen LLM Applications via Multi-Agent Conversation, arXiv:2308.08155, (2023).

Roy, A. et al., Master-Agent Orchestrated Multi-Agent Systems: An Automated Framework for Task-Driven Dynamic Agent Creation, V. Int. Conf. on Electrical, Comp. and Energy Tech., (2025).

* cited by examiner

800

Platform 822

Resources 824

Cloud
820

Computing Device 802

Processing
System 804

Hardware Elements 810

Computer-readable Media
806

Memory/
Storage 812

I/O
Interfaces 808

Data Generation System
110

Computer
814

Mobile
816

DYNAMIC ELECTRONIC DATA GENERATION THROUGH HUMAN-GUIDED MULTI-AGENT COLLABORATION

TECHNICAL FIELD

This disclosure generally relates to computer systems and methods for generating synthetic data, and more particularly, to a modular, multi-agent artificial intelligence framework that leverages human-in-the-loop governance, large language models, and specialized agents to dynamically generate high-quality, domain-specific synthetic datasets.

BACKGROUND

Machine learning and artificial intelligence systems demand access to extensive amounts of high-quality training data in order to function effectively. In practice, however, such datasets are often difficult to obtain because the real-world information needed may be scarce, tightly regulated, or considered proprietary. Privacy restrictions and data-sharing limitations further complicate the availability of training material.

Although current techniques attempt to address this issue, these solutions come with significant drawbacks. For example, methods that rely on a single large language model to generate synthetic data tend to inherit the weaknesses of that single generator, while agent-based simulators are constrained by rigidly defined rules and parameters. Both approaches fall short in key respects. For example, both approaches lack mechanisms for iterative human oversight that may guide and refine the outputs. These approaches also struggle to accommodate complex schemas involving multiple fields, and also encounter scalability problems caused by memory and context-window limitations. In addition, these solutions have limited capacity to adapt seamlessly across multiple data modalities such as text, images, and video.

Accordingly, there exists a need for a scalable, domain-agnostic, multi-agent electronic data generation framework that incorporates human governance, controlled variability, and automated validation.

SUMMARY

To address the aforementioned shortcomings, one aspect of the disclosure provides a system for dynamically generating synthetic data, including a memory and one or more processors, where the memory stores a computer program executable by the one or more processors, and when executing the computer program, the one or more processors are configured to perform: receiving, via a human-in-the-loop interface, input comprising a target data schema for an electronic data generation process; transmitting the received input to an orchestrator agent configured to decompose the electronic data generation process into discrete tasks and determine an execution strategy based on the discrete tasks; and invoking, according to the execution strategy, a plurality of autonomous agents to complete their respective tasks to generate synthetic data, where the plurality of autonomous agents includes: an input enrichment agent that broadens input parameters associated with the received input to generate a first intermediate output; a variability injection agent that introduces controlled complexity to the received input to generate a second intermediate output; and a data generation agent that synthesizes a final synthetic dataset conforming to the target data schema by integrating one or more of the first intermediate output and the second intermediate output into the electronic data generation process.

Another aspect of the disclosure provides a computer-implemented method for dynamically generating synthetic data, the method including: receiving, via a human-in-the-loop interface, input comprising a target data schema for an electronic data generation process; transmitting the received input to an orchestrator agent configured to decompose the electronic data generation process into discrete tasks and determine an execution strategy based on the discrete tasks; and invoking, according to the execution strategy, a plurality of autonomous agents to complete their respective tasks to generate synthetic data, where the plurality of autonomous agents includes: an input enrichment agent that broadens input parameters associated with the received input to generate a first intermediate output; a variability injection agent that introduces controlled complexity to the received input to generate a second intermediate output; and a data generation agent that synthesizes a final synthetic dataset conforming to the target data schema by integrating one or more of the first intermediate output and the second intermediate output into the electronic data generation process.

The above and other preferred features, including various novel details of implementation and combination of elements, will now be more particularly described with reference to the accompanying drawings and pointed out in the claims. It will be understood that the particular methods and apparatuses are shown by way of illustration only and not as limitations. As will be understood by those skilled in the art, the principles and features explained herein may be employed in various and numerous embodiments.

BRIEF DESCRIPTION OF THE DRAWINGS

The disclosed embodiments have advantages and features that will be more readily apparent from the detailed description, the appended claims, and the accompanying figures (or drawings). A brief introduction of the figures is below.

DETAILED DESCRIPTION

Figure 1:
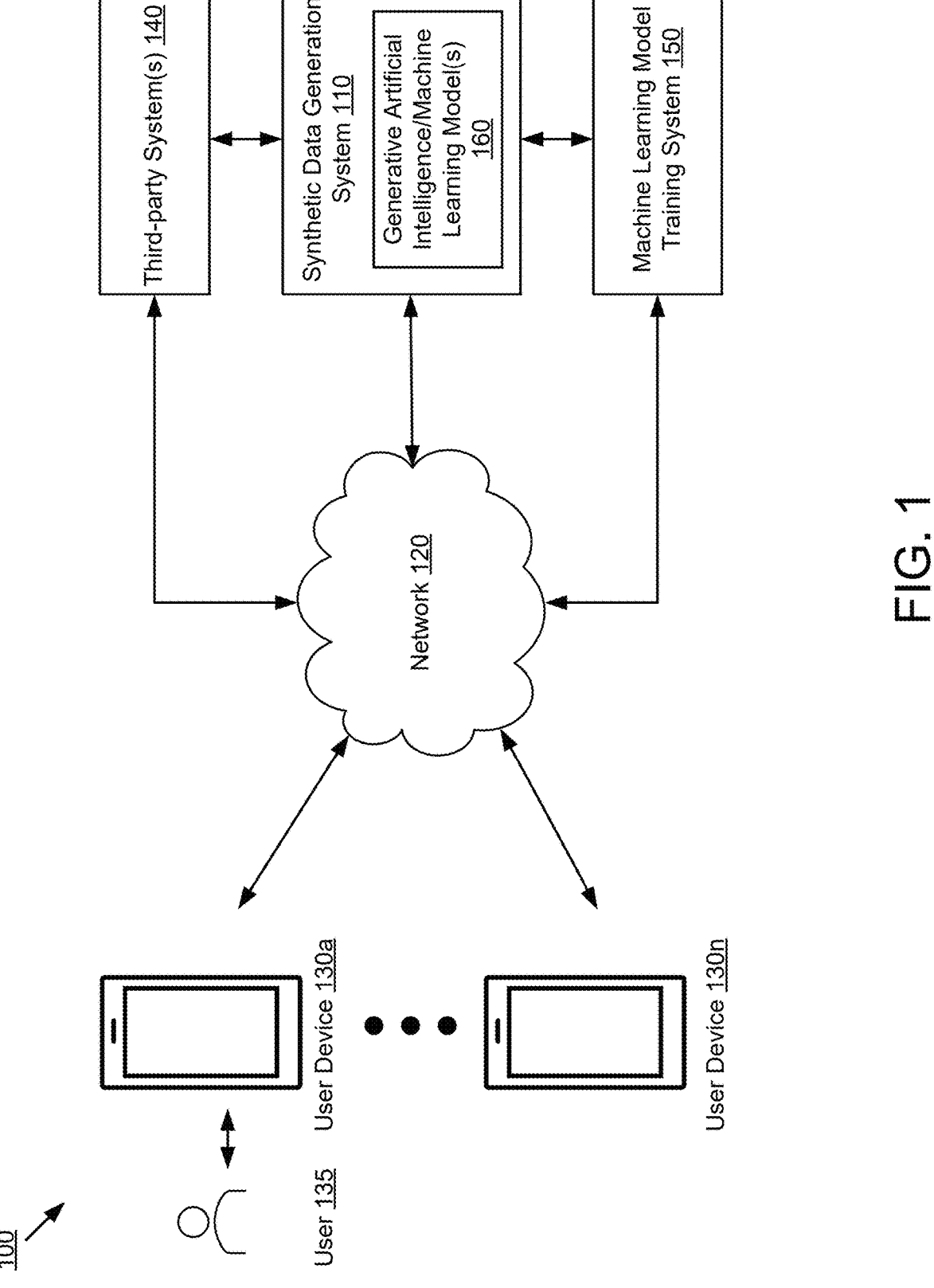
FIG. 1 is a schematic diagram illustrating an example system architecture for synthetic data generation, according to some embodiments.

The figures (FIGS.) and the following description relate to some embodiments by way of illustration only. It is to be noted that from the following description, alternative embodiments of the structures and methods disclosed herein will be readily recognized as viable alternatives that may be employed without departing from the principles of the present disclosure.

Reference will now be made in detail to several embodiments, examples of which are illustrated in the accompanying figures. It is to be noted that wherever practicable similar or like reference numbers may be used in the figures and may indicate similar or like functionality. The figures depict embodiments of the disclosed system (or method) for illustration purposes only. One skilled in the art will readily recognize from the following description that alternative embodiments of the structures and methods illustrated herein may be employed without departing from the principles described herein.

As described earlier, existing electronic data generation tools have certain limitations. For example, these electronic data generation tools often rely on single large language models (LLMs) or handcrafted simulators, which lack iterative oversight and often produce unrealistic or homogeneous datasets. These tools are unable to efficiently support complex multi-field schemas or multimodal requirements, leading to brittle outputs. In addition, context-window limitations and in-memory bottlenecks make large-scale electronic data generation infeasible. Moreover, these electronic data generation tools provide little built-in governance for bias detection or quality validation.

To address these problems in the existing electronic data generation tools, the disclosure provides a modular, multi-agent electronic data generation framework that decomposes the electronic data generation process into specialized tasks managed by an orchestrator agent. Each agent performs a discrete role in task resolution. For example, a topic modeling agent may extract hierarchical structures, an input enrichment agent may broaden coverage through web search retrieval and semantic expansion, a variability injection agent may simulate realistic complexities, and a data generation agent may synthesize outputs aligned with user-defined schemas. In addition, when addressing these specific tasks, intermediate artifacts may be serialized to external storage, eliminating context-window bottlenecks and enabling stateless, scalable execution. Furthermore, a validation tool and feedback loop may be included in the multi-agent electronic data generation framework to provide automated statistical checks, which are further enhanced by human-in-the-loop checkpoints for governance.

The disclosed multi-agent electronic data generation framework shows clear technical advantages when compared to the existing electronic data generation tools. For example, by decomposing the electronic data generation process into specialized agents, the framework produces synthetic data that captures greater variety and realism compared to monolithic prompt-engineering or simulator-based approaches. For instance, the variability injection agent may be configured to introduce orthogonal complexities such as omissions, personality traits, numeric perturbations, domain-specific irregularities, and linguistic style differences, which yield electronic datasets that better reflect the heterogeneity of real-world conditions. This translates into downstream machine learning models that generalize more effectively and exhibit fewer hallucinations In addition, the use of artifact serialization addresses a core computational bottleneck. By externalizing intermediate outputs as JSON artifacts, the disclosed multi-agent electronic data generation framework may avoid overloading the limited context window of large language models and circumvent in-memory storage constraints. This enables scalable, stateless execution, making it possible to synthesize millions of diverse samples across iterative runs without degradation in quality.

Furthermore, the integration of the validation tool and feedback loop automatically assesses distributional coverage, category balance, and schema conformity, thereby ensuring statistical robustness of the generated datasets. When gaps are detected, the multi-agent electronic data generation framework may iteratively refine inputs and variations. This creates a closed-loop system that continuously improves the fidelity of synthetic data generation.

It is to be noted that the benefits and advantages described herein are not all-inclusive, and many additional features and advantages will be further described under the context of specific embodiments. In addition, some additional features and advantages will become apparent to one of ordinary skill in the art in view of the figures and the following descriptions.

In the following, the multi-agent-based electronic data generation framework is described with reference to specific electronic data for machine learning model training. However, it is to be noted that the disclosed multi-agent-based electronic data generation framework is not limited to the electronic datasets for training purposes, but can be applied to many other different fields, such as software testing or workflow validation, privacy-preserving data sharing, data augmentation for analysis, regulatory compliance and auditing, etc. It should also be noted that, the electronic datasets described herein specifically refer to the electronic data that are generated and managed under computing environments, which include certain features not achievable through traditional physical or static documents. For example, the electronic datasets described herein may be automatically generated through certain generative AI tools without requiring human manipulation. For another example, the electronic datasets described herein may be automatically updated through the same AI tools or other different tools without human intervention.

FIG. 1 is a schematic diagram illustrating an example system architecture 100 for synthetic data generation, according to some embodiments. As illustrated in FIG. 1, the system architecture 100 may include a synthetic data generation system 110 operatively coupled, via a network 120, to one or more user devices 130a, ..., 130n (e.g., a mobile phone, computer, laptop, tablet, terminal, automated teller machine, wearable device, and the like), one or more third-party systems 140, and a machine learning model training system 150. The network 120 may interconnect the synthetic data generation system 110, user devices 130, machine learning model training system 150 with third-party system (s) 140. In this way, the synthetic data generation system 110 may send information to and receive information from the user devices 130, the third-party system(s) 140 and the machine learning model training system 150. In the illustrated embodiment, a plurality of user devices 130 provide a plurality of communication channels through which the synthetic data generation system 110, third-party system(s) 140, and/or machine learning model training system 150 may communicate with the user device 130 over the network 120.

In the illustrated embodiment in FIG. 1, the synthetic data generation system 110 may be configured to generate synthetic data for training and/or evaluating the machine learning models or for other different purposes. For example, one or more synthetic databases may be generated by the synthetic data generation system 110, which may be further communicated into the machine learning model training system 150 for training purposes. In some embodiments, the synthetic data generation system 110 may further include one or more generative artificial intelligence (AI) or other machine learning models 160 for generating synthetic data. For example, the generative AI or other machine learning models 160 may generate one or more text data, images, or video clips, which may be aggregated and sent for ml model training in bulk or batches.

The network 120 may include one or more of a variety of different types of networks, including a wireless network, a wired network, or a combination of a wired and wireless network. Examples of suitable networks include the Internet, a personal area network, a local area network (LAN), a wide area network (WAN), or a wireless local area network (WLAN). A wireless network may include a wireless interface or a combination of wireless interfaces. As an example, a network in one or more networks 120 may include a short-range communication channel, such as Bluetooth or a Bluetooth low energy channel. A wired network may include a wired interface. The wired and/or wireless networks may be implemented using routers, access points, bridges, gateways, or the like, to connect devices in the system. The one or more networks 120 may be incorporated entirely within or may include an intranet, an extranet, or a combination thereof. In one embodiment, communications between two or more systems and/or devices may be achieved by a secure communications protocol, such as a secure sockets layer or transport layer security. In addition, data and/or task completion details may be encrypted.

The user device 130 may be any computing endpoint capable of network communication with the orchestration environment. In some embodiments, the user device 130 may be a desktop computer, laptop, tablet, or mobile device. The device may run a graphical user interface (GUI) or web-based client application that allows a user 135 (e.g., an expert) to enter schema fields, upload sample records, or annotate business-specific constraints. For example, the user device 130 may provide a web form where the expert may specify that a dataset should contain "policy number," "incident type," and "claim amount" fields, or it may allow uploading a small set of example invoices in CSV or JSON format.

The user 135 refers to the human actor, such as a subject matter expert (SME), business analyst, or data scientist, who may interact with the synthetic data generation system 110 through the user device 130 and serves as the source of domain knowledge and governance. For example, the user 135 may provide important inputs that anchor the synthetic data pipeline to real-world requirements. At the outset, the user 135 may define the target schema, specify the structure and attributes that the synthetic dataset should include. For example, in an insurance application, the user 135 may designate "policy number," "incident type," and "total claim amount" as required fields. The user 135 may also contribute seed data, including a small number of representative examples, and domain-specific context, such as industry rules, allowable ranges, or compliance constraints. These inputs may be captured by the synthetic data generation system 110, which formats them into the structured schema JSON consumed by the rest of the system.

The third-party system(s) 140 refer to the external software services, data sources, or processing platforms that the electronic data generation framework may interface with during various stages of operation. They are not part of the core multi-agent system but provide auxiliary inputs, enrichment, or integration points that improve the quality, scope, and applicability of the synthetic datasets. From a technical perspective, the third-party system(s) 140 may take several forms. One class of systems includes external data providers or knowledge bases, such as public procurement databases, industry taxonomies, or open-source dictionaries. These may be queried by the synthetic data generation system 110 through web-scale retrieval to broaden categories or identify additional keywords relevant to a business domain. Another class may include machine learning and AI service platforms, such as external LLMs, embedding providers, or multimodal generation APIs, which the synthetic data generation system 110 may invoke for specialized processing tasks. For example, a third-party image generation API may be called to create synthetic product photos, or an embedding service may be used to expand semantic keyword clusters. In some embodiments, generative AI or other machine learning models 160 in FIG. 1 may be a part of the third-party systems 140 instead.

The machine learning model training system 150 refers to the downstream environment that consumes the validated synthetic datasets produced by the synthetic data generation system 110 and uses them to train, fine-tune, or evaluate machine learning models. While the synthetic data generation system 110 is responsible for producing large volumes of high-quality, domain-specific synthetic data, the training system 150 is responsible for ingesting this data, applying it to model training workflows, and outputting improved models ready for deployment.

It is to be noted that the machine learning models that use synthetic data for training can be any machine learning model, such as traditional supervised and unsupervised models as well as the generative AI models. For example, the synthetic data may be used to alter a generative model's response to give it personality traits related to safety friendliness or any other trait as desired. This process is also called instruction tuning, which uses a curated dataset (e.g., based on the synthetic data) to make a generative ai model better at following instructions. Additionally or alternatively, the generative AI model tuning may also include preference alignment, where a curated dataset is used to make a generative AI model's safer, give it a personality or tone.

Technically, the machine learning model training system 150 may include one or more training pipelines implemented using frameworks such as TensorFlow, PyTorch, or Scikit-learn, or enterprise-grade MLOps platforms like MLflow®, SageMaker®, or Databricks®, and the agentic frameworks that can be utilized to build these pipelines, such as LangGraph®, CrewAl®, etc. The synthetic dataset artifacts generated by the synthetic data generation system 110 may be transferred to the machine learning model training system 150 via secure APIs or artifact storage.

In some embodiments, the machine learning model training system 150 may be configured to combine synthetic datasets with limited volumes of real data in order to improve model calibration and reduce bias. This approach is particularly advantageous in highly regulated domains such as healthcare and finance, where access to large-scale, high-quality labeled data is constrained by privacy and compliance requirements. For example, an initial machine learning model trained solely on a small set of real-world patient records or financial transactions may be unable to achieve the desired accuracy or robustness. In such a case, the electronic data generation framework described herein may be utilized to produce a synthetic dataset that expands the training corpus while preserving schema alignment and statistical realism.

The synthetic dataset may then be used in one of two modes: (i) in hybrid mode, where synthetic and real data are combined into a unified training corpus, or (ii) in standalone mode, where synthetic data alone is applied to retrain or fine-tune the model. In both scenarios, the introduction of synthetic data provides broader category coverage, realistic variability, and enriched sample distributions that more closely reflect real-world operating conditions. As a result, the retrained machine learning model demonstrates significantly improved performance, with reductions in error rates, enhanced generalizability across edge cases, and greater resilience to data noise. In this manner, the interaction between the synthetic data generation system 110 and the training system 150 creates a closed-loop pipeline where synthetic data augments or substitutes for real data, yielding trained machine learning models that perform their expected functions with higher fidelity to real-world applications.

In some embodiments, integration between the two systems 110 and 150 may be orchestrated through metadata and lineage tracking. For example, each synthetic dataset artifact may carry provenance information, such as generation parameters, applied variations, schema version, etc., which allows the machine learning model training system 150 to reproduce experiments and audit model performance. In this way, the machine learning model training system 150 operates as a natural extension of the electronic data generation system: while the latter ensures availability of realistic and diverse data, the former leverages it to produce accurate, generalizable, and bias-aware machine learning models.

FIG. 1 illustrates only one example of an embodiment of the architecture 100. It will be appreciated that in other embodiments, one or more of the systems, devices, or servers may be combined into a single system, device, or server, or be made up of multiple systems, devices, or servers. It should be understood that the servers, systems, and devices described herein illustrate one embodiment of the disclosure. It is further understood that one or more of the servers, systems, and devices can be combined in other embodiments and still function in the same or similar way as the embodiments described herein.

Figure 2:
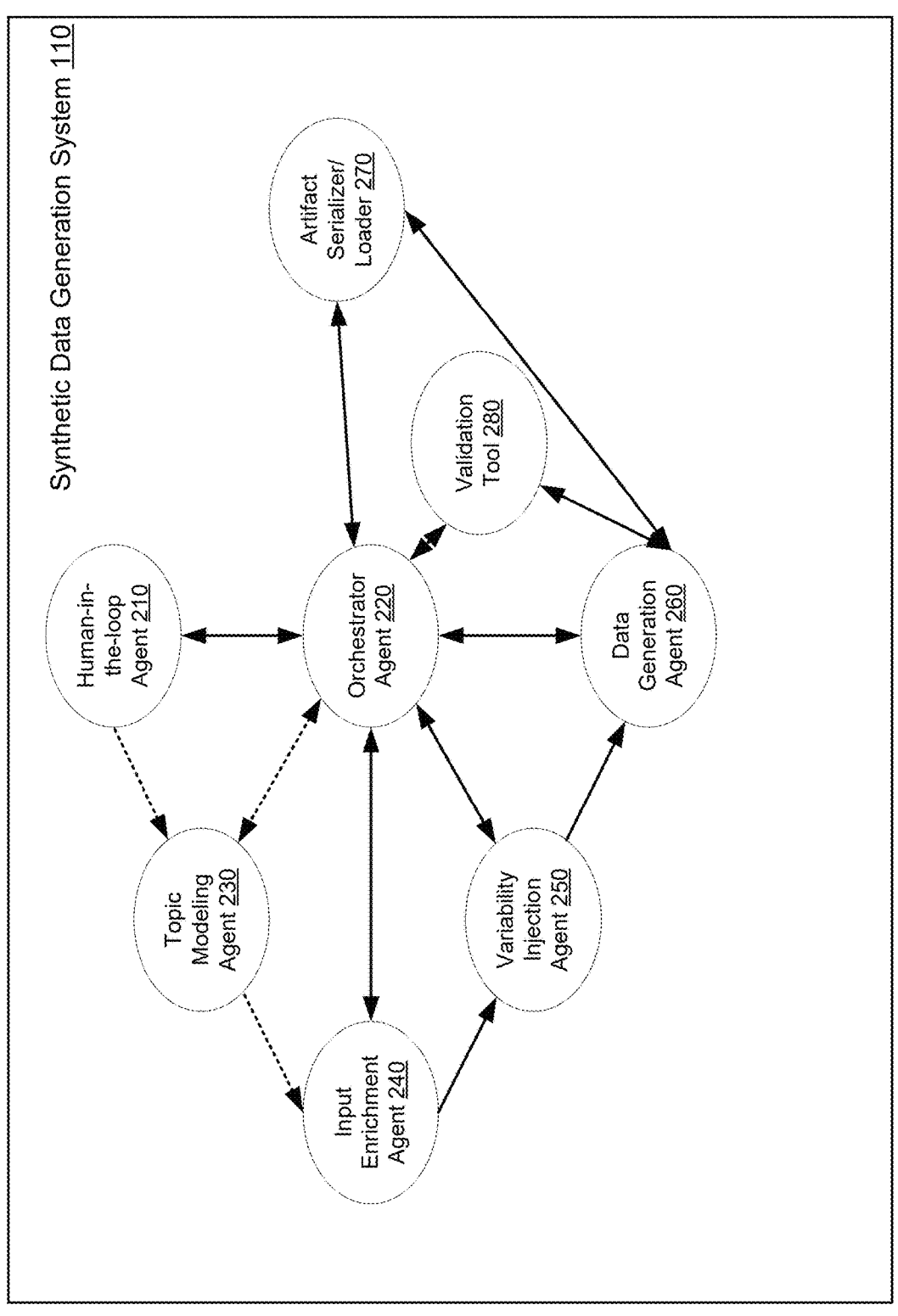
FIG. 2 is a schematic diagram illustrating example components included in a synthetic data generation system, according to some embodiments.

FIG. 2 is a schematic diagram illustrating example components included in the synthetic data generation system 110, according to some embodiments. As can be seen from FIG. 2, the synthetic data generation system 110 may be a multi-agent system that includes a human-in-the-loop agent 210, an orchestrator agent 220, a topic modeling agent 230, an input enrichment agent 240, a variability injection agent 250, a data generation agent 260, an artifact serializer/loader 270, and a validation tool 280. Each agent may be a specialized, autonomous software component that performs a discrete, well-defined role in the electronic data generation pipeline. For example, each agent may be configured to handle a particular subtask, such as topic modeling, input enrichment, variability injection, or data synthesis, and operates either sequentially, in parallel or hybrid workflows under the supervision of the orchestrator agent 220.

It should be noted that, in the disclosed electronic data generation system 110, an agent is not a general-purpose model, but rather a task-specific module that has certain reasoning capabilities. For example, an agent may be empowered by a large language model or domain-specific AI model that enables the agent to interpret inputs, follow instructions, and produce structured outputs. In some embodiments, an agent may also be configured to access certain external tools, such as web search, keyword expansion, image or video generation, or statistical validation to augment its reasoning and extend functionality beyond pure text generation. In addition, an agent may also have the ability to read from and write to the artifact serializer/loader 270, ensuring that intermediate outputs are preserved as machine-readable files. This enables agents to communicate indirectly by exchanging serialized artifacts instead of relying on shared memory or long prompts, overcoming LLM context limitations. As will be described in detail later, while each agent can act autonomously to complete its subtask, a special configured orchestrator agent 220 may govern when an agent is invoked, what inputs it receives, and how its outputs are used by subsequent agents. This then allows multiple agents to act like specialist workers in a collaborative assembly line to form a modular, domain-agnostic framework, where each agent's independence ensures scalability and each agent's specialization ensures higher quality and diversity in the generated synthetic data. The specific agents included in the disclosed framework are further described in detail below.

The human-in-the-loop agent 210 serves as the entry point into the framework and directly involves domain experts in the electronic data generation process. It enables users to define the target schema, specify the structure and attributes of the dataset, and provide optional seed data or domain-specific context. In some embodiments, the human-in-the-loop agent 210 may transform human-provided information into a structured schema JSON, which becomes the foundation of the workflow. The structured schema includes separate fields for (i) desired output data schema and (ii) business information and contextual parameters to be supplied to different agents for execution of their respective tasks. The human-in-the-loop agent 210 may also ensure that a downstream process remains tethered to business logic and regulatory requirements. Once its job is complete, the human-in-the-loop agent 210 may pass the structured inputs to the orchestrator agent 220.

The aforementioned seed data may refer to a small collection of actual examples from the target domain that serve as a starting point or reference for synthetic data generation. In other words, the workers or agents are provided a small sample product to copy from. Example seed data may include but is not limited to a handful of real insurance claim emails, a few invoice-to-purchase-order pairs, some sample medical records, etc. This data does not need to be large, but it anchors the system in the vocabulary, style, and structure of the real-world use cases. The topic modeling agent 230 and input enrichment agent 240 may analyze this seed data to extract categories, keywords, and patterns that guide the generation of much larger synthetic datasets.

The aforementioned domain-specific context may refer to the additional business or industry knowledge provided by subject matter experts through the human-in-the-loop agent 210. This is similar to providing the agents with the design blueprint, quality standards, and industry-specific guidelines for synthetic data generation. Example domain-specific context may include but is not limited to details like the schema of the dataset (what fields should appear), company or industry-specific rules, common abbreviations, regional variations, compliance constraints, etc. For example, in healthcare, the context may specify that synthetic records should include age, diagnosis, and prescribed medication fields; in finance, the context may specify that invoice data should include currency codes and tax fields; and in specific invoice data, the context may include a list of different domains a company works in, keywords associated with products of each domain, context about the industry the company is associated with. Together, seed data and domain-specific context may ensure that the agents in the system don't generate generic or irrelevant outputs but instead produce synthetic datasets that are realistic, domain-aligned, and useful for training machine learning models.

In some embodiments, to transform human-provided information into a structured schema JSON, the human-in-the-loop agent 210 may detect the structure of the seed data, identifying candidate fields, and mapping them to canonical names that reflect the business domain. Semantic clustering may be further applied to infer data types, constraints, and allowable ranges, while subject matter expertise may add requirements such as mandatory fields, compliance rules, or controlled vocabularies. The result is a schema JSON output that not only contains the output schema of the dataset to be generated, but also a clear segregation of different information provided by user like domain business information and other important context. By encoding this information into a structured format, the framework may ensure that downstream agents, such as topic modeling, input enrichment, variability injection, and electronic data generation agents, work from a consistent foundation. This makes the overall pipeline scalable, reproducible, and aligned with both real-world data characteristics and domain-specific requirements.

In some embodiments, subject matter experts may not provide domain-specific context or seed data. At this point, relevant business context is collected and analyzed to determine whether domain aligned data can be created. If there is sufficient business context, synthetic data can still be generated without seed data. If there is insufficient business context, the human-in-the-loop agent 210 may automatically fall back to a domain-agnostic mode to fill-in some sort of descriptions for each field. In this mode, instead of relying on specialized business knowledge, the human-in-the-loop agent 210 may generate a baseline schema JSON in accordance with what kind of data is supposed to be created by using a set of generic data fields and structures common across industries. For example, the human-in-the-loop agent 210 may default to neutral categories such as identifiers, names, timestamps, amounts, and descriptions. These generic placeholders may act as scaffolding so that the downstream agents, such as topic modeling, input enrichment, and variability injection agents, may still have a schema to work from and introduce synthetic diversity without domain bias.

The technical rationale for this fallback is scalability and robustness. Without it, the pipeline may stall if no contextual information is available. By enforcing a domain-agnostic default, the orchestrator agent 220 may still progress through the workflow, invoking input enrichment to expand categories with web-retrieved terms and using variability injection to introduce noise systematically. The resulting datasets may be more abstract than industry-aligned ones, but they preserve the framework's utility for testing, benchmarking, or generic model pre-training. Once domain context or seed data is later introduced, the same human-in-the-loop agent 210 may override or extend the baseline schema, merging domain-specific structures with the default scaffolding.

Referring now to the orchestrator agent 220, it acts as the central coordinator of the entire framework. Specifically, the orchestrator agent 220 may evaluate the information received from the human-in-the-loop agent 210 and decompose the electronic data generation task into modular subtasks. Depending on whether seed data is available, the orchestrator agent 220 may determine whether to invoke the topic modeling agent 230 or bypass it to save resources. In some embodiments, the orchestrator agent 220 may also manage execution order, enabling sequential, parallel, or hybrid workflows. In some embodiments, beyond task delegation, the orchestrator agent 220 may also maintain global awareness. For example, the orchestrator agent 220 may invoke the validation tool 280 once data has been generated, and based on the feedback, loop the process back to the input enrichment agent 240 and/or variability injection agent 250 for iterative refinement.

In some embodiments, to achieve the above-described functions, the orchestrator agent 220 may operate as a stateful controller that builds and executes a set of tasks across the topic modeling, input enrichment, variability injection, data generation, and validation components. The orchestrator agent 220 may begin by parsing the structured schema JSON and any seed data metadata emitted by the human-in-the-loop agent 210, then perform capability planning to determine which agents are required, in what order, and which can run concurrently. Planning outputs may include a run manifest that lists tasks, their input artifact URIs, expected output artifact contracts, and resource hints such as model context requirements or maximum batch sizes. In some embodiments, the orchestrator agent 220 may persist this manifest and an execution cursor in the artifact store, which allows idempotent restarts and mid-run recovery without replaying completed work.

In some embodiments, at runtime, the orchestrator agent 220 may treat each agent invocation as a remote procedure with strict I/O contracts defined by JSON schemas. Rather than passing large contexts through prompts, the orchestrator agent 220 may provide agents with signed artifact pointers (e.g., artifact://topic/inputs@v1) and a small control payload that includes run IDs, step IDs, and execution parameters. Agents may read their inputs from the artifact store, produce outputs that satisfy the declared contracts (for example, inputs.json for enrichment or variations.json for variability), and write those back as versioned artifacts. The orchestrator agent 220 may verify each artifact against its schema, annotate it with lineage (e.g., upstream step IDs, model version, and hyperparameters), and advance dependent nodes. This artifact-bus pattern may decouple agents and avoid large-context bottlenecks by ensuring that merely compact control messages traverse the orchestration channel while all heavy data flows through storage.

In some embodiments, the orchestrator agent 220 may be further configured to manage scheduling and concurrency with a small, event-driven state machine. When the seed data exists, the topic modeling task may be scheduled first; otherwise, the orchestrator agent 220 bypasses it and immediately forks input enrichment and variability injection so they can run in parallel (or in sequence under certain circumstances). In some embodiments, the orchestrator agent 220 may monitor heartbeats and partial outputs to implement back-pressure: if enrichment expands the input space beyond configured limits, the orchestrator agent 220 may shard the work into batches and queue multiple electronic data generation subtasks that can run concurrently across workers.

In some embodiments, the orchestrator agent 220 may control each task to execute under a retry policy with exponential backoff. Transient failures may trigger retries, while deterministic validation errors may transition the run to a "needs-review" state with a structured error artifact describing which constraints were violated. In some embodiments, the orchestrator agent 220 may guide placement decisions based on the resource hints, such as routing long-context workloads to models with larger windows, or splitting generation into P-sized batches aligned with the lower-bound sample estimate. In some embodiments, the orchestrator agent 220 may enforce quality control through a post-generation validation phase that the orchestrator agent invokes automatically once sufficient batches complete, as will be described in detail later.

In some embodiments, the disclosed system may further include a mechanism to automatically estimate the minimum number of unique samples that can be generated in a given run of the multi-agent synthetic data generation framework. This feature allows developers and operators to determine, before executing the full synthesis process, whether the input parameters, variation sets, and system configuration will yield sufficient dataset volume for the intended downstream machine learning or analytics tasks.

Specifically, the orchestrator agent 220 may compute a lower bound on the number of samples N that the framework is capable of generating during one iteration. The calculation may be performed using a closed-form expression that accounts for three factors: the number of defined variations, the number of input categories, and the batching configuration of the data generation agent. The formula may be expressed as:

$$N \geq \left( \prod_{v_i \in V} \binom{v_i}{1} \right) \times \left( \sum_{j=1}^{|C|} \left\lceil \frac{\text{key}_j}{k} \right\rceil \right) \times P$$

where N represents the total number of samples to be generated by the multiagent framework in one run, $v_i$ represents number of variations in i-th variation belong to variation set V, $\text{key}_j$ represents the number of categories in the j-th category list in the list of categories generated by input enrichment agent, k represents a hyperparameter to be set by the developer representing number of input keywords to be sent in one API call to the data generation agent 260, and P represents the number of samples to be generated in one API call by the data generation agent 260.

This mathematical construct ensures that dataset generation is predictable and scalable. For example, if the input enrichment agent 240 outputs 50 categories, the variability injection agent 250 defines three variation sets with 5, 10, and 8 variations respectively, the hyperparameter k is set to 5, and the data generation agent produces 20 records per call, the system may compute a conservative lower bound on total dataset size before execution. In this way, the orchestrator may detect when input or variation coverage is insufficient, adjust batch scheduling, or prompt the enrichment agent to generate additional categories to meet volume requirements.

Referring now to the topic modeling agent 230, this component is selectively invoked by the orchestrator agent 220 when seed data has been provided by the human-in-the-loop agent 210. The topic modeling agent 230 may be configured to employ LLMs with extended context windows of ≥128 k tokens (or another different value), thereby enabling the analysis of both the seed data and any accompanying domain-specific context in a single reasoning pass. For example, the topic modeling agent 230 may parse through the raw examples and context, extract recurring terms, entities, and relationships, and then cluster them into a hierarchical topic map. This topic map may include a hierarchical list of domain categories (including certain categories, sub-categories), and associated salient keywords from the seed data that mirrors the domain's semantic structure. Therefore, through the process, the topic modeling agent 230 may capture not only surface-level tokens but also latent relationships and contextual hierarchies.

In some embodiments, the outputs of the topic modeling agent 230 may be persisted as serialized JSON artifacts that conform to a predefined schema. These artifacts may include lists of canonical category names, representative keywords for each category, and metadata about the relative frequency or importance of each category. Once generated, these artifacts may be transmitted to the input enrichment agent 240, which uses them as a foundation to further expand coverage through keyword expansion, web-scale retrieval, and iterative refinement. In this way, the topic modeling agent 230 may ensure that the synthetic data pipeline begins with a contextually faithful representation of the target domain, thereby reducing the risk of generic or irrelevant data synthesis. In addition, by grounding the process in actual domain patterns, the topic modeling agent 230 may enable downstream components to produce synthetic datasets that more closely resemble the distribution, vocabulary, and structure of real-world data.

Referring now to the input enrichment agent 240, this component operates downstream of the topic modeling agent 230 or, in the absence of seed data, directly from the schema JSON produced by the human-in-the-loop agent 210. The input enrichment agent 240 is configured to broaden the breadth and depth of the available input parameters such that the resulting synthetic dataset reflects both diversity and domain relevance. To achieve this, the input enrichment agent 240 may integrate several mechanisms.

In a first mode for web-scale retrieval, the input enrichment agent 240 may issue search queries derived from the categories or schema fields and retrieve structured lists from authoritative sources. For example, when the target domain is invoice processing, input enrichment agent 240 may retrieve industry catalogs of product categories such as "office supplies," "electronic components," or "construction materials" from public procurement databases or supplier websites. These lists are then parsed, cleaned, and added as expanded values under the corresponding input categories.

In the second mode for keyword expansion based on semantic similarity, the input enrichment agent 240 may employ embedding models or thesaurus-style knowledge bases to identify synonyms and related terms for the existing keywords. For instance, if the topic modeling agent 230 produces the keyword "laptop," the input enrichment agent 240 may automatically expand it to include "notebook computer," "ultrabook," and "workstation." Similarly, for the insurance claims domain, an initial category of "collision" may be expanded with related terms such as "accident," "impact," and "crash." This semantic expansion may ensure that the generated dataset is not limited to a narrow vocabulary but instead captures the full range of domain terminology.

In a third mode for iterative refinement, the input enrichment agent 240 may evaluate the sufficiency and diversity of the enriched inputs by comparing them against statistical thresholds or schema coverage requirements. If gaps are detected, for example, if the "vehicle model" field only contains three unique values while the minimum threshold is set to ten, the input enrichment agent 240 may automatically perform another cycle of retrieval and expansion to supplement the list with additional values such as "sedan," "SUV," "pickup truck," and "convertible." Similarly, if the "incident location" field lacks sufficient diversity, the input enrichment agent 240 may query additional geographies until the coverage is balanced across categories. This iterative refinement loop may continue until the enriched inputs JSON achieve the specified coverage metrics.

In some embodiments, the outputs from these different modes are compiled into an enriched inputs JSON artifact. This artifact encodes each input type as a structured field, with its associated list of expanded values, metadata regarding their provenance, and annotations indicating relevance scores or confidence levels. For each numerical input parameter, the system may further define explicit mathematical ranges (minimum, maximum, and step size), while categorical input fields are constrained by enumerated sets of permissible values. The enriched artifact may be serialized and stored in the artifact repository to ensure persistence and traceability, as described earlier. Copies of the artifact may be then distributed to the data generation agent 260, which relies on these enriched parameters to synthesize realistic records, and/or to the orchestrator agent 220, which uses the metadata for monitoring workflow progress, scheduling subsequent tasks, and enforcing quality control. Through these mechanisms, the input enrichment agent 240 may ensure that the system's electronic data generation pipeline does not rely solely on narrow or incomplete inputs, but rather on a comprehensive and context-aware parameter space suitable for producing high-quality synthetic datasets.

Referring now to the variability injection agent 250, this component is configured to introduce controlled complexity into the dataset so that the generated records may more faithfully replicate real-world conditions. Operating under the direction of the orchestrator agent 220, the variability injection agent 250 may synthesize a structured artifact known as a "variations JSON." This artifact may encode a plurality of variation types and their associated parameter values, which together simulate the irregularities commonly encountered in production data streams. These irregularities may manifest as missing fields (e.g., omission of policy numbers or invoice subtotals), typographical errors (e.g., "inovic" instead of "invoice"), unit inconsistencies (e.g., "kg" versus "lbs"), or multilingual inputs where portions of the data are rendered in secondary languages. Additional examples of such variability include the introduction of acronyms and abbreviations (e.g., "Amt." for "Amount"), the use of serial numbers and codes (e.g., "product-0097"), and non-standard capitalization or punctuation patterns (e.g., "prdct_name" or "Product Name"). The agent may also inject behavioral-driven variations, such as differences in tone, personality, or narrative style, where customer-authored records display informal language, politeness markers, or urgency cues.

The variability injection agent 250 may persist these variations as a machine-readable JSON file that specifies not only the variation type but also frequency parameters, distribution weights, and any cross-field dependencies. For example, a variation file may stipulate that five percent of claim requests omit an incident time field, while another ten percent employ non-standard date formats. Once produced, this variations JSON is transmitted to the data generation agent 260, which cross-references the variation specifications with the enriched inputs JSON generated by the input enrichment agent 240. This joint consumption ensures that each synthetic record is drawn from a valid combination of canonical input parameters while also exhibiting a layer of authentic imperfection. In effect, the variability injection agent 250 may ensure that the dataset does not merely achieve categorical breadth, but also embodies the noise, errors, and stylistic inconsistencies that characterize operational data. Furthermore, the injected variations may be aligned with domain-specific information as defined by SMEs, thereby ensuring that the irregularities reflect authentic practices and conventions within the target domain (e.g., the invoice-related examples of acronyms, abbreviations, serial codes, and non-standard capitalization referenced above). This controlled imperfection may enable downstream machine learning models to train against more realistic distributions, thereby improving resilience and generalizability.

Referring now to the data generation agent 260, this component represents the culmination of the multi-agent framework, synthesizing the final synthetic dataset by integrating the schema definitions received from the human-in-the-loop agent 210, the enriched input parameters produced by the input enrichment agent 240, and the structured variation artifacts created by the variability injection agent 250. The data generation agent 260 may execute its function through a series of predefined generation prompts and modular toolchains. It may systematically iterate over every valid combination of inputs and variations, ensuring that each record conforms to the schema while also embodying the real-world imperfections specified in the variations JSON. The outputs are therefore not only logically consistent but also semantically faithful to domain requirements.

In some embodiments, the data generation agent 260 may dynamically select from different generation strategies depending on the data modality. For example, for text-only schemas, the data generation agent 260 may invoke prompt-based large language model generation routines that combine category keywords with contextual variations. Where multimodal data is required, the data generation agent 260 may be equipped to invoke specialized image or video generation modules, for example, generating accident scene images to accompany insurance claim narratives or product images to pair with invoice line descriptions. These multimodal outputs may be then merged into complete records, with references or embedded URIs inserted into the synthetic dataset. In some embodiments, all generated samples are serialized into machine-readable formats such as JSON, CSV, or Parquet, and may include companion metadata describing generation parameters and provenance.

In one example text-only electronic data generation in the insurance domain, the data generation agent 260 may take the enriched inputs such as "policy number," "incident type," "incident location," and "claim amount," along with variations like missing values or informal writing style. The data generation agent 260 then assembles a prompt for a large language model that instructs it to generate a complete synthetic claim request email. For example, using inputs {policy number: PL-98321, incident type: collision, claim amount: $4,500} and variations {tone: urgent, missing field: incident time}, the data generation agent 260 may assemble a prompt for a large language model that instructs it to generate an email that states: "Dear claims department, I was in a car accident last week involving my sedan. My policy number is PL-98321, and the repair cost is estimated at $4,500. Please process this claim urgently." This output is then stored in JSON format, annotated with metadata to indicate which variation types were applied. In some embodiments, a plurality of emails may be generated based on each valid combination of inputs and variations.

In another example of generating a retail invoice dataset, the enriched inputs may include "product category: electronics," "item: laptop," and "brand: GenericTech." Variations may specify different packaging conditions (e.g., "damaged box" or "open packaging"). The data generation agent 260 may pass these instructions to an image generation tool such as a generative adversarial network (GAN), variational autoencoders (VAE), autoregressive model, transformer-based model, or diffusion model. The output may be a synthetic product image depicting a laptop in various conditions. In some embodiments, the generated image may be saved as a file (e.g., PNG), and the dataset record contains a URI linking to the image, along with the structured invoice metadata. In some embodiments, a plurality of synthetic product images may be generated based on each valid combination of inputs and variations.

In yet another example in video electronic data generation for a manufacturing predictive maintenance dataset, inputs may include "machine type: conveyor belt," "issue: bearing failure," and "location: assembly line A." Variations may simulate environmental noise or operator handling differences. Using these inputs, the data generation agent 260 may invoke a video generation tool, such as Google Veo®, Runway®, Sora®, Descript®, Capsule®, Adobe Firefly®, invideo AI®, and the like, to produce a short clip showing a conveyor belt with increasing vibration and noise, simulating early signs of failure. The video output may be stored in MP4 format, and the synthetic record links the video with corresponding tabular fields such as timestamp, machine ID, and failure type. In some embodiments, a plurality of short clips may be generated based on each valid combination of inputs and variations.

In some embodiments, after generation of various emails, product images, or short clips, or other different datasets, the data generation agent 260 may direct its outputs simultaneously to the artifact serializer/loader 270, which persists each batch as versioned artifacts with full lineage tracking, and/or to the validation tool 280, which performs statistical and structural quality checks. In this way, the data generation agent 260 may ensure that the final dataset is comprehensive, diverse, and ready for downstream consumption by machine learning pipelines, while maintaining auditability and compliance through standardized artifact management.

Referring now to the artifact serializer/loader 270, this component functions as the framework's memory management and persistence layer, enabling scalability across arbitrarily large runs. Rather than relying on in-memory context to pass outputs between agents, each agent may externalize its results by writing them to disk in the form of structured JSON artifacts. These artifacts may be stored with associated metadata that captures essential generation parameters such as the upstream agent identifier, the model version used, the hyperparameters applied, and any randomization seeds. By including this metadata, the system may ensure that every synthetic record and intermediate file can be traced back to the exact conditions under which it was created.

In some embodiments, the corresponding loader module may allow downstream agents to retrieve artifacts as required, using standardized references or URIs. For example, the data generation agent 260 may load enriched inputs and variation artifacts previously emitted by the input enrichment agent 240 and the variability injection agent 250, respectively. Because artifacts are retrieved from persistent storage, the system may operate in a stateless mode, meaning agents can be restarted, rescheduled, or run in parallel without dependency on long context windows or ephemeral memory. This configuration thus directly overcomes the context-window limitations of large language models, prevents "lost-in-the-middle" errors, and eliminates bottlenecks associated with high-volume in-process data.

In some embodiments, the artifact serializer/loader 270 may enable the framework to scale horizontally, generating millions of records across multiple iterations while maintaining both coherence and reproducibility. For instance, in an insurance claim dataset, thousands of enriched variations and input categories may be serialized once and reused across multiple synthetic runs, without requiring re-computation or re-prompting. The loader may ensure that each agent consumes the precise version of the artifact needed, preserving traceability and allowing audit logs to reconstruct complete electronic data generation workflows. Through this mechanism, the artifact serializer/loader 270 may underpin the scalability, resilience, and regulatory auditability of the entire multi-agent framework.

Referring now to the validation tool 280, this component may be automatically invoked by the orchestrator agent 220 following the completion of one or more electronic data generation batches. The validation tool 280 may function as the framework's quality assurance module, systematically applying statistical and structural analyses to ensure that the generated dataset meets predefined standards of coverage, variety, and fidelity. Specifically, the validation tool 280 may evaluate one or more of (i) category coverage by verifying that all categories and sub-categories identified in the schema and enrichment phases are represented in sufficient quantities, (ii) diversity of variations by measuring the distribution of applied irregularities such as missing fields, multilingual text, or typographical noise, (iii) schema adherence or referential integrity checks by validating records against the canonical schema JSON produced by the human-in-the-loop Agent 210, and (iv) proportional distributions by comparing observed frequencies with expected ratios defined by subject matter experts or business rules.

In some embodiments, the results of these analyses may be compiled into a structured feedback report, which includes metrics, statistical graphs, and error logs. For example, the validation tool 280 may report that only 3% of generated invoice records contained currency fields expressed in "EUR," whereas the target proportion was 20%. The validation tool 280 may also detect schema violations, such as claim requests missing mandatory "policy number" fields, or records containing improperly formatted timestamps. In some embodiments, this feedback report may be serialized as a JSON artifact and returned to the orchestrator agent 220. Upon review, the orchestrator agent 220 may re-engage the input enrichment agent 240 to broaden the set of values in underrepresented categories, and/or the variability injection agent 250 to rebalance variation distributions. By doing so, the validation tool 280 may enable the system to operate as a closed-loop control mechanism, ensuring that synthetic datasets improve iteratively with each cycle until statistical thresholds and schema conformity are satisfied.

Through this continuous improvement cycle, the validation tool 280 may guarantee that the final synthetic datasets are not only logically consistent but also statistically robust and aligned with real-world distributions. This provides measurable assurance that models trained on such datasets will generalize effectively, while maintaining compliance with schema-level and business-level expectations.

In some embodiments, the validated synthetic dataset produced by the framework may be utilized as training data for a machine learning model. The dataset may be employed either in isolation, where the synthetic records alone form the training corpus, or in combination with a limited set of real-world data samples to augment model performance. For example, a synthetic dataset of insurance claim request emails may be used to fine-tune a natural language processing model for entity extraction, while a smaller collection of actual claims serves as a ground truth calibration set. In another example, in the accounts payable domain, synthetic invoice-to-purchase-order records may be merged with anonymized real invoice samples to train a matching model with enhanced robustness. By enabling this hybrid training approach, the disclosed system allows organizations to achieve model accuracy and generalizability comparable to real data training, while mitigating privacy risks and reducing reliance on scarce or regulated datasets.

Figure 3:
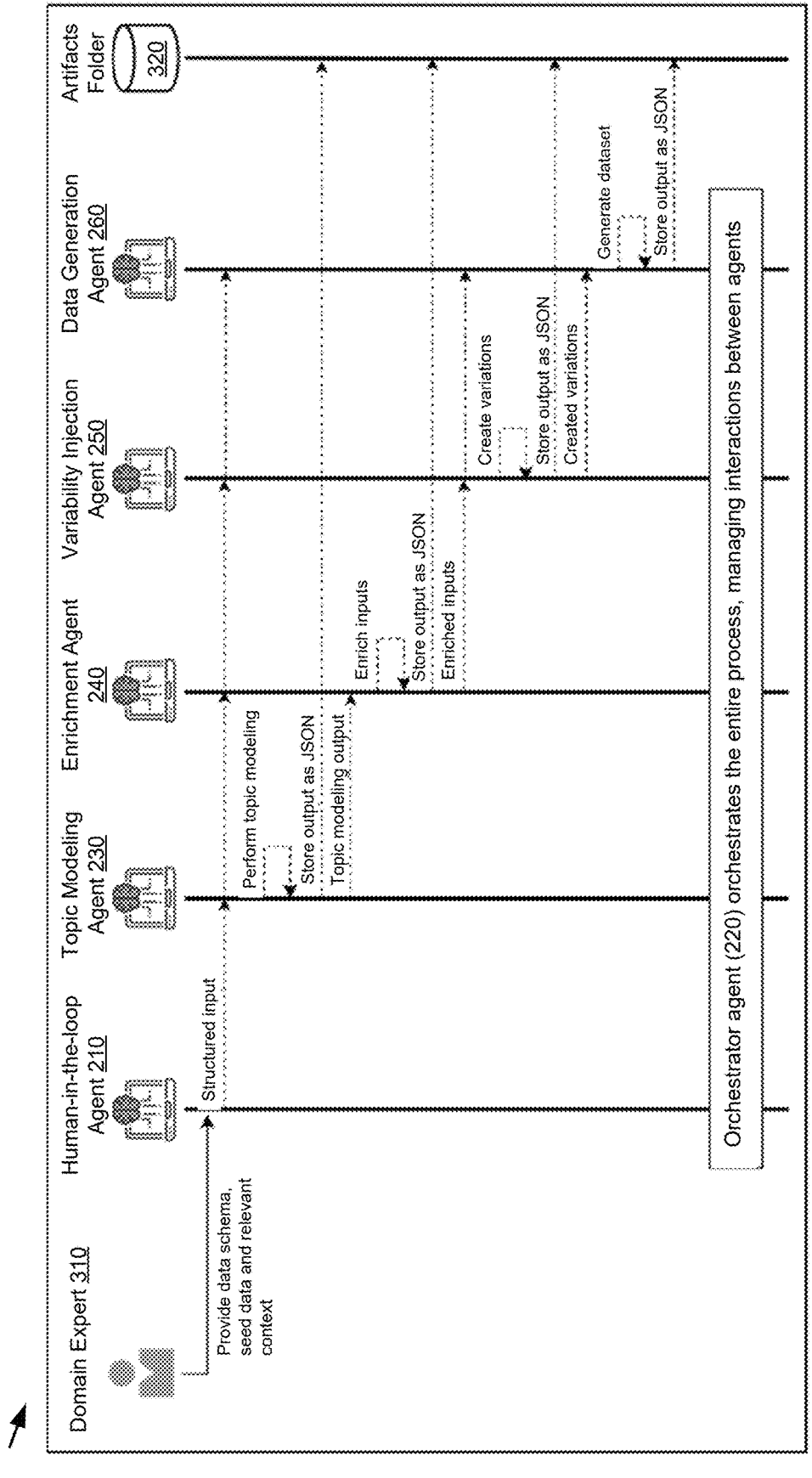
FIG. 3 is a sequence diagram illustrating how different agents collaborate under the orchestration of the system to generate synthetic data, according to some embodiments.

FIG. 3 is a sequence diagram 300 illustrating how different agents collaborate under the orchestration of the system to generate synthetic data, according to some embodiments. It begins with the domain expert 310, who serves as the source of business knowledge and requirements. The domain expert 310 may provide the framework with essential inputs, such as the target data schema, optional seed data, and relevant context containing all necessary business information. These inputs may be structured and transmitted to the human-in-the-loop agent 210, which ensures that the data is properly formatted and aligned with the intended use case.

The human-in-the-loop agent 210 may produce a structured input that is then passed to the LLM-augmented topic modeling agent 230. This agent 230 may leverage large language models to analyze seed data and relevant context, producing a categorized hierarchy of topics and keywords. The results may be stored as a JSON artifact in the artifacts folder 320, ensuring that subsequent agents have access to reusable, machine-readable outputs.

Next, the process moves to the input enrichment agent 240, which may take either the topic modeling output or the original structured input if no seed data is available. Its role is to enhance the dataset parameters through enrichment techniques, such as web-scale information retrieval, keyword expansion, or iterative refinement. Once completed, the input enrichment agent 240 may store enriched inputs as a JSON artifact in the artifacts folder 320, making them available to downstream components.

The variability injection agent 250 may operate on these enriched inputs by creating structured variations that mimic real-world complexities. These may include but are not limited to linguistic differences, missing data elements, behavioral patterns, or contextual irregularities. Like the previous steps, the generated variations may be preserved as JSON outputs in the artifacts folder 320 for consistency and traceability.

Following this, the data generation agent 260 may synthesize the final dataset. The data generation agent 260 may integrate the enriched inputs and the injected variations, producing synthetic records that conform to the target schema. Each dataset is stored as JSON, allowing for both inspection and downstream use. This ensures logical consistency and realism in the generated data.

In the process, the artifacts folder 320 may act as persistent storage for all intermediate and final outputs. Each agent's contributions, such as topic models, enriched inputs, variations, and final datasets, are preserved as serialized artifacts. This not only prevents loss of context but also allows the system to scale without being constrained by in-memory limitations.

Overseeing the entire process is the orchestrator agent 220, represented at the bottom of the figure. Although not shown as a separate column, the orchestrator agent 220 may coordinate interactions between agents, determining execution order, handling dependencies, and ensuring that outputs from one component flow seamlessly into the next. The orchestrator agent 220 may effectively govern the workflow, enabling dynamic adjustments based on whether seed data is present or additional refinements are required.

Figure 4:
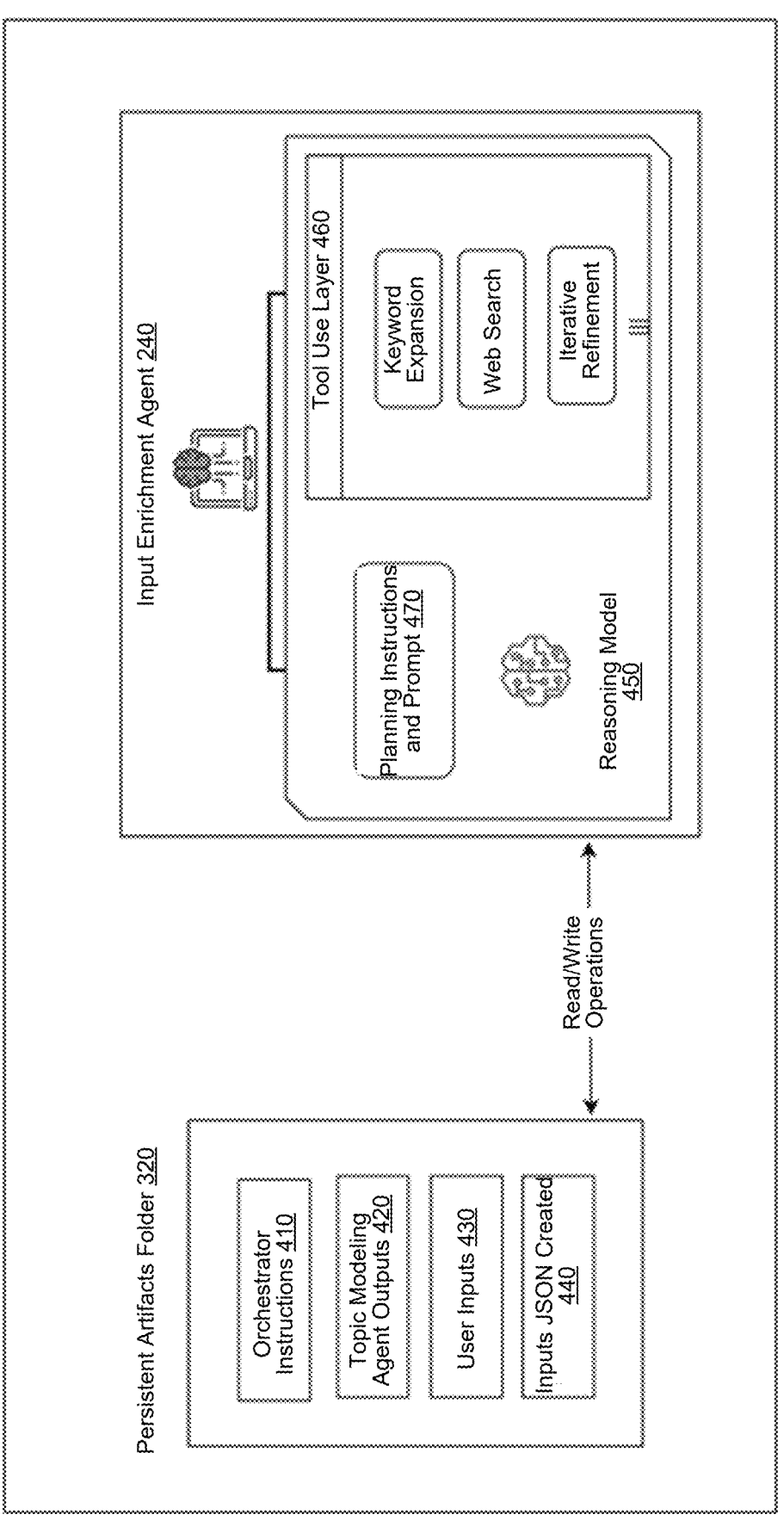
FIG. 4 illustrates example internal workings of an input enrichment agent and its interaction with a persistent artifacts folder, according to some embodiments.

FIG. 4 illustrates internal workings of the input enrichment agent 240 and its interaction with the persistent artifacts folder 320, according to some embodiments. On the left-hand side, the persistent artifacts folder 320 is shown as a structured repository that stores outputs and instructions from multiple components in the framework. These include but are not are not limited to orchestrator instructions 410, outputs 420 generated by the topic modeling agent, direct user inputs 430, and any previously created inputs JSON files 440. The artifacts folder 320 may serve as a centralized memory layer, allowing different agents to access and reuse intermediate results without being constrained by the memory or context window of a large language model. The input enrichment agent 240 may communicate with this folder through read and write operations, ensuring that data flows smoothly between steps and can be persistently retrieved for further processing.

On the right-hand side, the input enrichment agent 240 itself is depicted as a modular system. At its core lies a reasoning model 450, which is configured to execute planning instructions and interpret prompts 470 provided either by the orchestrator agent 220 or based on the prior artifacts. In some embodiments, the reasoning models referenced herein, including the reasoning model 450 and other models used by agents described in this specification, may be instantiated as text-based large language models, thereby enabling advanced natural language understanding and generative capabilities. This reasoning model 450 may govern the agent's decision-making, determining how to expand and refine the input parameters. Surrounding the reasoning process is the tool use layer 460, which provides the operational capabilities of the agent. Specifically, the tool use layer 460 may employ three primary tools (although other tools are also possible): keyword expansion 470, which broadens the vocabulary and semantic range of inputs; web search 480, which retrieves supplementary information from external sources to increase coverage; and iterative refinement 490, which ensures that the enriched inputs are comprehensive, relevant, and statistically balanced.

Together, these elements highlight the input enrichment agent's role as both a reasoning-driven and tool-assisted component. By continuously reading from and writing to the persistent artifacts folder 320, the input enrichment agent 240 may not only expand the diversity of input parameters but also ensure traceability and reusability of intermediate outputs, thereby enabling a scalable and context-rich electronic data generation pipeline.

Figure 5:
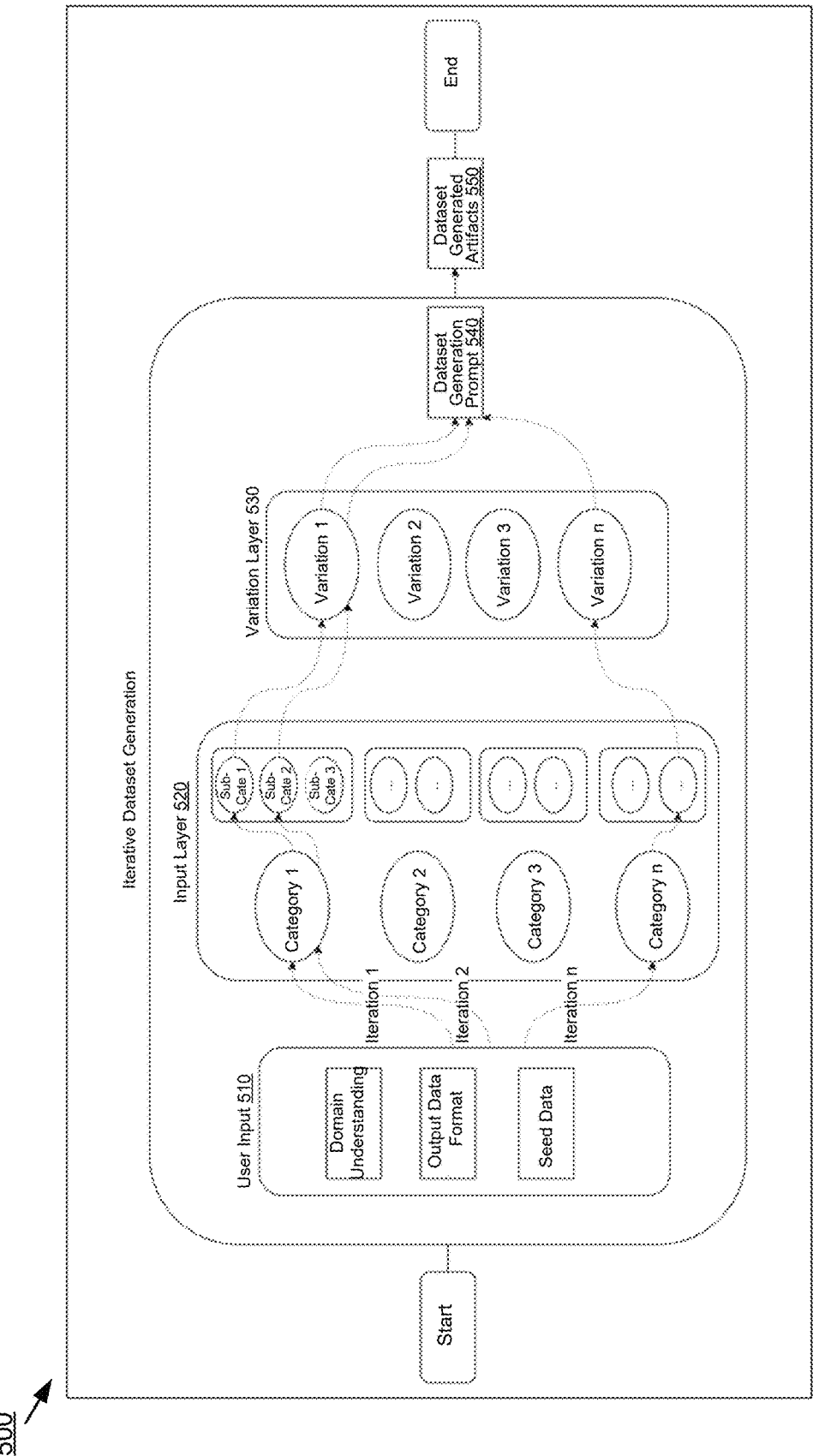
FIG. 5 illustrates an example iterative dataset generation process, according to some embodiments.

FIG. 5 illustrates an iterative dataset generation process 500, showing how user-provided inputs are systematically expanded into synthetic datasets through the interaction of categorized inputs and structured variations, according to some embodiments.

The workflow begins on the left with user inputs 510, which may include domain understanding, the desired output data format, and optional seed data. In practice, these user inputs are streamlined and conveyed by a human-in-the-loop agent, which serves as a proxy to capture, structure, and validate the information initially provided by the end user. This ensures that the collected inputs are complete, consistent, and readily consumable by the downstream components. These inputs form the foundation for dataset creation, ensuring that the generated outputs align with electronic data generation requirements and domain-specific constraints.

Once the inputs 510 have been defined, the data enters the input layer 520, where the information is systematically organized into categories for structured processing. Each category, for example, category 1, category 2, category 3, and so forth, may further contain multiple sub-categories and associated data elements. This hierarchical arrangement may enable the system to represent a broad spectrum of real-world entities, events, or attributes that are relevant to the designated problem domain. For instance, in the insurance claims domain, one category may correspond to "vehicle information," containing sub-categories such as make, model, and year, while another category may represent "incident details," with sub-categories such as location, time, and type of incident. In the accounts payable domain, categories may include "invoice details," "purchase order attributes," and "supplier information," each with their respective sub-fields.

In some embodiments, the system performs iterative sampling across categories, whereby different subsets of input elements are selected in successive cycles to ensure adequate diversity and coverage. For example, an iteration may sample only a subset of vehicle models combined with certain incident types, while subsequent iterations select different model-incident combinations. This iterative approach ensures that the synthetic dataset includes a wide range of realistic permutations without overrepresenting any single category. By adopting this layered and iterative design, the input layer 520 may provide a structured and scalable foundation for generating synthetic datasets that faithfully reflect the complexity and diversity of real-world scenarios.

In some embodiments, parallel to the structured inputs of the input layer 520, the system may further employ a variation layer 530, which is configured to introduce controlled irregularities into the dataset. The variation layer 530 may include multiple variation sets, such as variation 1, variation 2, variation 3, and so forth, each encoding a distinct dimension of real-world complexity. These variation sets are not fixed or strictly predefined; rather, they are dynamically generated and supplied by the variability injection agent 250, which tailors the variations to reflect authentic irregularities and domain-specific conditions. These variation sets may include, without limitation, typographical noise (for example, misspelled product descriptions such as "laptpo" in place of "laptop"), field omissions (such as invoices without tax amounts or claims missing the incident location), unit inconsistencies (e.g., "kg" versus "kilograms" versus "lbs"), multilingual substitutions (for example, invoice line items partially written in Spanish or French), and behavioral-driven differences in tone or style (such as formal versus informal language in customer correspondence).

The system may systematically apply these variation sets to the categories defined in the input layer 520, thereby producing enriched samples that combine canonical input values with realistic perturbations. For instance, a base category representing "invoice line item: monitor, $200" may be transformed through variation sets to yield alternate records such as "inv. line: monitr—200 USD," or "Artículo: monitor, Precio: 200€," simulating the irregularities typically encountered in real-world datasets. By leveraging this structured variability, the system may ensure that the generated data embodies authentic imperfections rather than idealized records, thereby strengthening the resilience of machine learning models trained on such data.

In some embodiments, the outputs of the variation layer 530 and the enriched input layer are then fed into a dataset generation prompt 540, which operates as the synthesis engine for producing final data records. The dataset generation prompt integrates selected input categories, such as entities, keywords, or schema-defined fields, with their corresponding variation parameters, thereby ensuring that each record reflects both canonical domain structure and authentic irregularities. During execution, the prompt may be parameterized with instructions that dictate schema conformity, logical consistency across fields, and distributional balance among variations. For instance, when generating invoice-to-purchase-order pairs, the dataset generation prompt may align enriched categories like "product description" with injected variations such as abbreviations, acronyms, or typographical inconsistencies, producing synthetic pairs that mirror realistic business documents. Similarly, in an insurance use case, the prompt may combine a policy number, all other field inputs with variations introducing missing incident times or informal claimant language. The result of this integration is a set of synthetic samples that are both structurally faithful to the target schema and enriched with sufficient variability to train robust machine learning models.

Finally, the system produces a dataset-generated artifact 550, which marks the successful completion of the electronic data generation pipeline. This artifact is a structured, machine-readable file, such as JSON, CSV, or Parquet, accompanied by metadata that records generation parameters, applied variations, and schema conformity results. The dataset-generated artifact 550 may serve as the consumable output of the framework and may be employed in a variety of downstream applications. In some embodiments, the dataset-generated artifacts 550 may be used to fine-tune machine learning models for specific domain tasks, such as entity extraction from insurance claim emails or line-item matching between invoices and purchase orders. In other embodiments, the dataset-generated artifact 550 may be applied to validate end-to-end workflows by simulating data traffic in enterprise pipelines, thereby enabling organizations to stress-test system performance under realistic but privacy-safe conditions.

Figure 6:
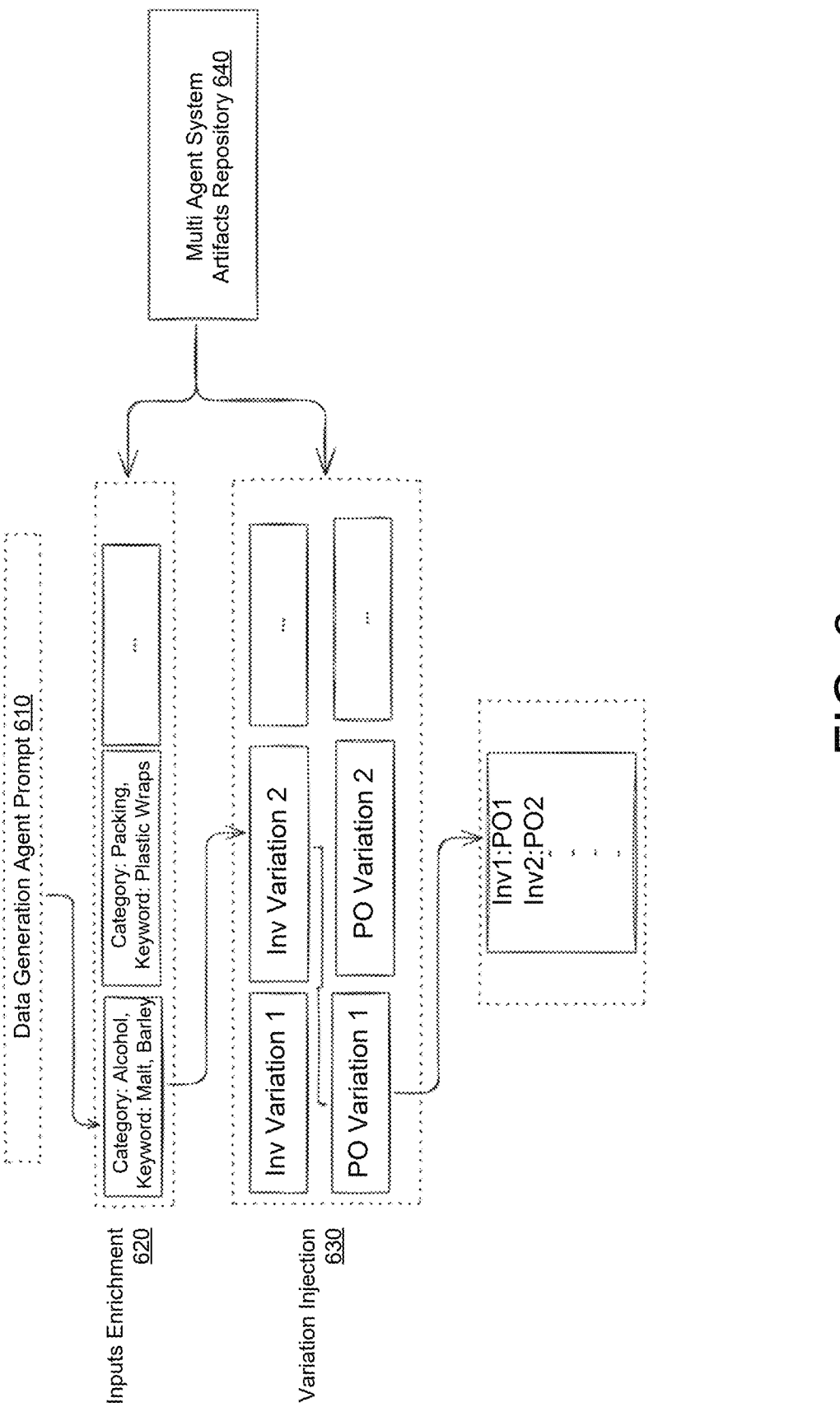
FIG. 6 illustrates an example interaction between inputs, variations, and a data generation agent in producing synthetic datasets, according to some embodiments.

FIG. 6 illustrates an example interaction between inputs, variations, and the data generation agent in producing synthetic datasets, according to some embodiments.

At the top of the figure, the data generation agent prompt 610 is shown as the driving mechanism that integrates different components of the system. It receives enriched input parameters and structured variations, combining them in a way that generates synthetic records conforming to the intended schema.

On the left, the diagram distinguishes between two major sources of inputs. The inputs enrichment stream 620 may contribute domain-relevant categories and keywords. For example, one enriched input may include the category "alcohol" with keywords such as "malt" and "barley," while another may relate to "packing" with keywords like "plastic wraps." These enriched inputs represent the core subject matter around which the dataset is constructed.

Beneath this, the variation injection stream 630 may introduce complexity into the dataset through structured variations. Examples include invoice-specific variations ("inv variation 1," "inv variation 2") and purchase-order-specific variations ("PO variation 1," "PO variation 2"). These variations may simulate real-world irregularities such as different terminology, inconsistent formatting, or industry-specific abbreviations. By systematically pairing these variations with enriched inputs, the system may ensure that the generated data is not only semantically meaningful but also reflective of the noise and heterogeneity found in real-world business contexts.

The outputs from these enrichment and variation layers are then processed by the data generation agent, which creates synthetic records such as invoice-to-purchase-order pairs. For instance, "Inv1:PO1" and "Inv2:PO2" illustrate how variations from invoices and purchase orders are mapped together to generate realistic, domain-aligned records.

Finally, all generated datasets and intermediate artifacts are stored within the multi-agent system artifacts repository 640. This ensures that every enriched input, variation file, and generated record is preserved in a traceable, machine-readable format, allowing subsequent agents or validation tools to reuse, refine, or audit the data.

Overall, FIG. 6 demonstrates how the system orchestrates the fusion of domain-enriched inputs and injected variations through the data generation agent to create robust synthetic datasets, while maintaining transparency and scalability through artifact storage.

Figure 7:
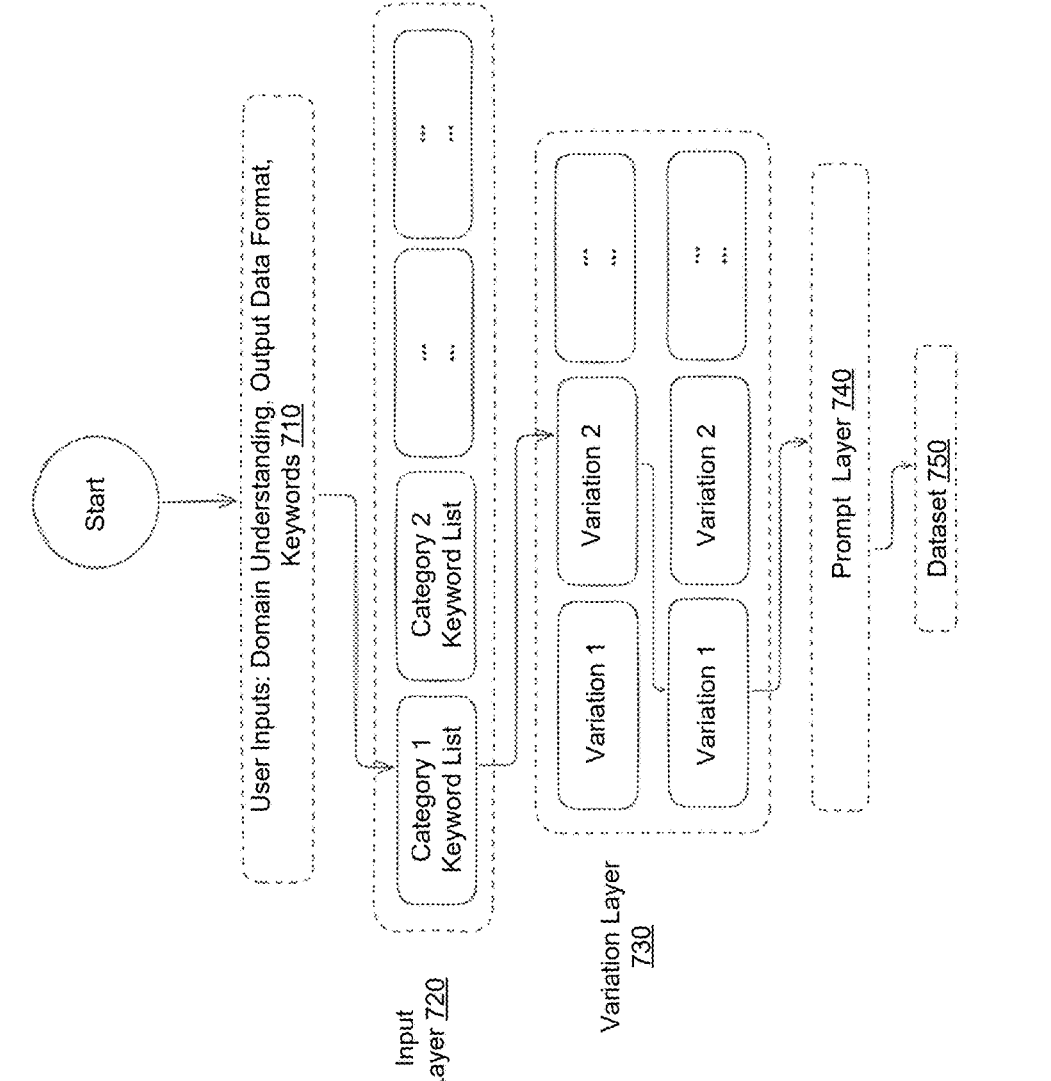
FIG. 7 illustrates an example layered workflow for synthetic dataset generation, according to some embodiments.

FIG. 7 illustrates a layered workflow 700 for synthetic dataset generation, showing how user-provided information is systematically transformed into a final dataset through sequential processing stages.

The process begins at the start point, where the system receives user inputs at step 710. These inputs may include domain understanding, the desired output data format, and specific keywords that capture the essence of the relevant context. In practice, the inputs are conveyed by the human-in-the-loop agent, which acts as a proxy to streamline, validate, and structure the information initially provided by the user. Together, they provide the initial framework upon which the dataset will be constructed.

The first processing stage is the input layer 720, where user inputs are structured into categories. For example, category 1 and category 2 may each contain a list of keywords relevant to different subdomains or business areas. These keyword lists serve as the foundation of the dataset, defining the thematic scope and ensuring domain alignment.

Next, the workflow moves into the variation layer 730, where complexity is introduced. For example, each category's keyword list is paired with variations, such as variation 1 or variation 2, that simulate real-world irregularities. These variations may represent alternative phrasing, abbreviations, typographical inconsistencies, or context-driven differences. By combining categories with multiple layers of variations, the system may ensure that the generated data captures both semantic diversity and realistic noise.

Following this, the outputs may pass into the prompt layer 740, where the structured inputs and variations are synthesized through predefined generation prompts. The prompts may orchestrate the alignment between enriched categories and injected variations, instructing the electronic data generation model to produce coherent and contextually meaningful records.

Finally, the process culminates in the creation of the dataset 750, a synthetic collection of records that reflects both the structured input categories and the injected variability. This dataset is not only aligned with the user-defined schema but is also robust enough to replicate the complexities of real-world data, making it valuable for training and evaluating machine learning models.

Example Applications

In one exemplary application, the disclosed framework is employed in the field of insurance claims processing. Specifically, the framework is configured to generate realistic synthetic claim request emails that reflect the diversity and imperfections of real-world communications. These synthetic records may include varied email formats, incomplete or missing fields, and nuanced narrative descriptions of accident events. When machine learning models are fine-tuned on this synthetic dataset, these models may achieve higher accuracy in extracting key entities such as policy numbers, incident details, and claim amounts, while also demonstrating a measurable reduction in hallucination rates relative to baseline models trained only on limited real data.

In another application, the disclosed framework is applied to accounts payable workflows, specifically invoice-to-purchase-order matching. Here, the framework may generate synthetic invoice and purchase-order line descriptions that incorporate domain-specific variations such as acronyms, abbreviations, synonyms, and typographical errors. These imperfections mimic the conditions under which financial data is typically processed in practice. By training matching models on this enriched dataset, organizations may realize significantly improved alignment accuracy, even when confronted with noisy or inconsistent real-world records.

The disclosed framework may also find application in healthcare, where synthetic patient records may be generated to preserve privacy while still retaining realistic structure and variability. For example, the framework may produce synthetic datasets with plausible demographic distributions and medical histories, including irregularities such as incomplete symptom reports or varied coding styles. These privacy-preserving datasets may be used to develop and validate predictive diagnostic models without exposing sensitive patient information, thereby reducing regulatory risks.

A further application arises in the domain of manufacturing predictive maintenance. In this setting, the disclosed framework generates synthetic logs that simulate real operational conditions, including sensor noise, fluctuating machine states, and variable maintenance delays. Such datasets allow AI systems to learn from rare or catastrophic failure scenarios that are unlikely to be captured in limited historical data. As a result, predictive maintenance models trained on these synthetic logs exhibit improved robustness in identifying early warning signals and preventing costly downtime.

Implementing Device

In some embodiments, the various data generation systems disclosed herein may be implemented on a computing system with access to a hard disc or remote storage, as further described in detail below.

Figure 8:
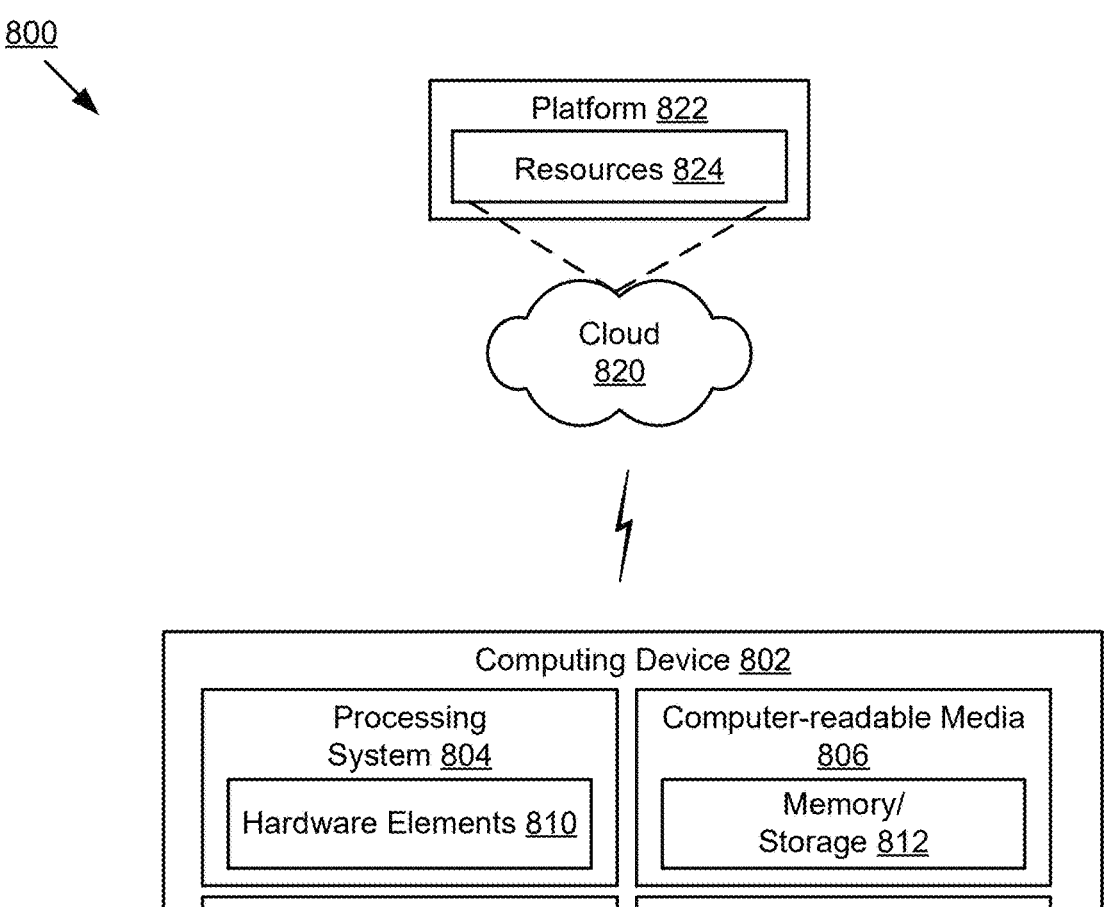
FIG. 8 is a block diagram of an example implementing device for synthetic data generation, according to some embodiments.
Figure 8:
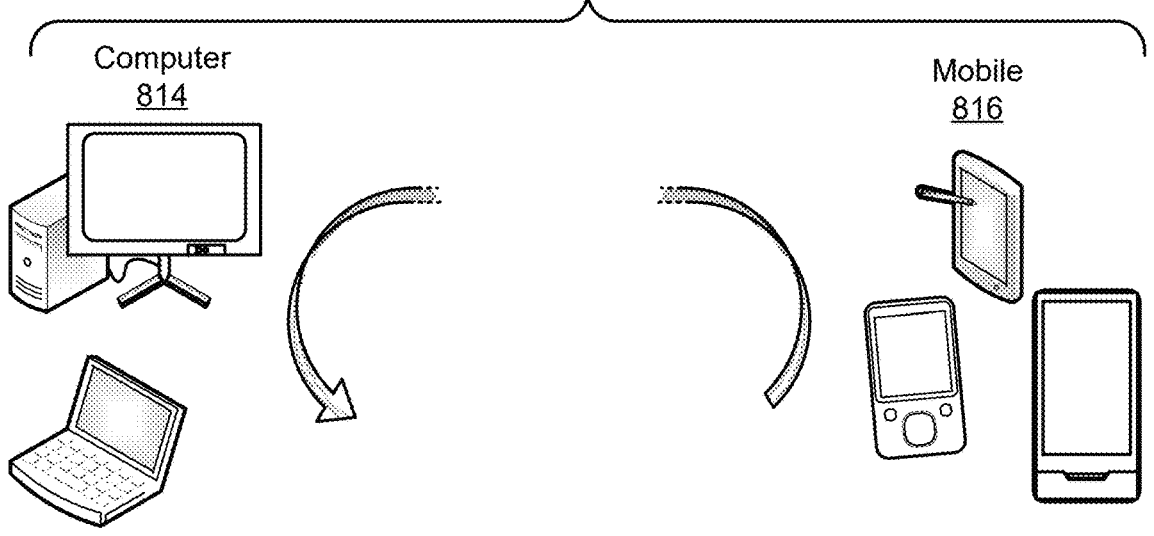

FIG. 8 illustrates an example system 800 that, generally, includes an example computing device 802 that is representative of one or more computing systems and/or devices that may implement the various techniques described herein.

The example computing device 802 as illustrated includes a processing system 804, one or more computer-readable media 806, and one or more I/O interfaces 808 that are communicatively coupled, one to another. Although not shown, the computing device 802 may further include a system bus or other data and command transfer system that couples the various components, from one to another. A system bus may include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 804 is representative of the functionality to perform one or more operations using hardware. Accordingly, the processing system 804 is illustrated as including hardware element 810 that may be configured as processors, functional blocks, and so forth. This may include implementation in hardware as an application-specific integrated circuit (ASIC) or other logic devices formed using one or more semiconductors. The hardware elements 810 are not limited by the materials from which they are formed, or the processing mechanisms employed therein. For example, processors may be comprised of semiconductor(s) and/or transistors, e.g., electronic integrated circuits (ICs). In such a context, processor-executable instructions may be electronically executable instructions.

The computer-readable media 806 is illustrated as including memory/storage 812. The memory/storage 812 represents memory/storage capacity associated with one or more computer-readable media. The memory/storage 812 may include volatile media (such as random-access memory (RAM)) and/or nonvolatile media (such as read-only memory (ROM), Flash memory, optical disks, magnetic disks, and so forth). The memory/storage 812 may include fixed media (e.g., RAM, ROM, a fixed hard drive, and so on) as well as removable media, e.g., Flash memory, a removable hard drive, an optical disc, and so forth. The computer-readable media 806 may be configured in a variety of other ways as further described below.

Input/output interface(s) 808 are representative of functionality to allow a user to enter commands and information to computing device 802, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movements as gestures that do not involve touch), and so forth. Examples of output devices include a display device (e.g., a monitor or projector), speakers, a printer, a network card, a tactile-response device, and so forth. Thus, the computing device 802 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "unit," "component," and "engine" as used herein generally represent software, firmware, hardware, or a combination thereof. The features of the techniques described herein are platform-independent, meaning that the techniques may be implemented on a variety of commercial computing platforms having a variety of processors.

As previously described, hardware elements 810 and computer-readable media 806 are representatives of modules, engines, programmable device logic, and/or fixed device logic implemented in a hardware form that may be employed in one or more implementations to implement at least some aspects of the techniques described herein, such as to perform one or more instructions. Hardware may include components of an integrated circuit or on-chip system, an ASIC, a field-programmable gate array (FPGA), a complex programmable logic device (CPLD), and other implementations in silicon or other hardware. In this context, hardware may operate as a processing device that performs program tasks defined by instructions and/or logic embodied by the hardware as well as hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 810. The computing device 802 may be configured to implement particular instructions and/or functions corresponding to the software and/or hardware modules. Accordingly, implementation of an engine that is executable by the computing device 802 as software may be achieved at least partially in hardware, e.g., through the use of computer-readable storage media and/or hardware elements 810 of the processing system 804. The instructions and/or functions may be executable/operable by one or more articles of manufacture (for example, one or more computing devices 802 and/or processing systems 804) to implement techniques, modules, and examples described herein.

In the example system 800, multiple devices are interconnected through a central computing device. The central computing device may be local to multiple devices or may be located remotely from the multiple devices. In one embodiment, the central computing device may be a cloud of one or more server computers that are connected to multiple devices through a network, the internet, or other data communication link.

In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a family of target devices is created, and experiences are tailored to the family of devices. A family of devices may be defined by physical features, types of usage, or other common characteristics of the devices.

In various implementations, the computing device 802 may assume a variety of different configurations, such as for computer 814 and mobile 816 uses, and for many enterprise use, IoT use, and many other uses not illustrated in FIG. 8. Each of these configurations includes devices that may have generally different constructs and capabilities, and thus the computing device 802 may be configured according to one or more of the different device classes. For instance, the computing device 802 may be implemented as the computer 814 family of a device that includes a personal computer, desktop computer, multi-screen computer, laptop computer, netbook, and so on. The computing device 802 may also be implemented as the mobile 816 family of devices that include mobile devices, such as a mobile phone, a portable music player, a portable gaming device, a tablet computer, a wearable device, a multi-screen computer, and so on. In some embodiments, the devices may be classified according to their constraints instead, as described earlier.

The techniques described herein may be supported by these various configurations of the computing device 802 and are not limited to the specific examples of the techniques described herein. This is illustrated through the inclusion of a data generation system 110 on the computing device 802, where the data generation system 110 may include different units or modules as illustrated in FIGS. 1-7. The functionality represented by the data generation system 110 and other modules/applications may also be implemented all or in part through the use of a distributed system, such as over a "cloud" 820 via a platform 822 as described below.

The cloud 820 includes and/or is representative of platform 822 for resources 824. The platform 822 abstracts the underlying functionality of hardware (e.g., servers) and software resources of the cloud 820. Resources 824 may include applications and/or data that can be utilized while computer processing is executed on servers that are remote from the computing device 802. Resources 824 can also include services provided over the internet and/or through a subscriber network, such as a cellular or Wi-Fi network.

The platform 822 may abstract resources and functions to connect the computing device 802 with other computing devices 814 or 816. The platform 822 may also serve to abstract the scaling of resources to provide a corresponding level of scale to encountered demand for the resources 824 that are implemented via platform 822. Accordingly, in an interconnected device implementation, the implementation functionality described herein may be distributed throughout system 800. For example, the functionality may be implemented in part on the computing device 802 as well as via the platform 822 which abstracts the functionality of the cloud 820.

ADDITIONAL CONSIDERATIONS

While this disclosure may contain many specifics, these should not be construed as limitations on the scope of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. Under certain circumstances, multitasking and parallel processing may be utilized. Moreover, the separation of various system components in the implementations described above should not be understood as requiring such separation in all implementations, and it should be understood that the described program components and systems may generally be integrated together into a single software or hardware product or packaged into multiple software or hardware products.

Some systems may use certain open-source frameworks for storing and analyzing big data in a distributed computing environment. Some systems may use cloud computing, which may enable ubiquitous, convenient, on-demand network access to a shared pool of configurable computing resources (e.g., networks, servers, storage, applications, and services) that may be rapidly provisioned and released with minimal management effort or service provider interaction.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive or" may be used to indicate situations where only the disjunctive meaning may apply.

What is claimed is:

1. A system for dynamically generating synthetic data, including a memory and one or more processors, wherein the memory stores a computer program executable by the one or more processors, and when executing the computer program, the one or more processors are configured to perform:

receiving, via a human-in-the-loop interface, input comprising a target data schema for an electronic data generation process;

transmitting the received input to an orchestrator agent configured to decompose the electronic data generation process into discrete tasks and determine an execution strategy based on the discrete tasks; and invoking, according to the execution strategy, a plurality of autonomous agents to complete the discrete tasks to generate the synthetic data, wherein the plurality of autonomous agents includes:

an input enrichment agent that broadens a number and types of input parameters associated with the received input to generate a first intermediate output;

a variability injection agent that introduces controlled complexity to the received input to generate a second intermediate output; and a data generation agent that generates the synthetic data conforming to the target data schema by integrating one or more of the first intermediate output and the second intermediate output into the electronic data generation process, wherein the orchestrator agent provides signed artifact pointers and control payloads to the plurality of autonomous agents instead of raw context data.

2. The system of claim 1, wherein the received input further includes seed data, and the plurality of autonomous agents further includes a topic modeling agent configured to perform topic modeling and categorization on the seed data and relevant context for the electronic data generation process, so as to extract hierarchical structures of categories and keywords relevant to the target data schema.

3. The system of claim 2, wherein the data generation agent generates the synthetic data conforming to the target data schema by integrating one or more of the first intermediate output, the second intermediate output, and hierarchical structures of categories and keywords relevant to the target data schema.

4. The system of claim 2, wherein the topic modeling agent uses a large language model with an extended context window to analyze the seed data.

5. The system of claim 1, wherein the plurality of autonomous agents further includes a human-in-the-loop agent that transforms the input, received via the human-in-the-loop interface, into a structured schema in JSON format, the structured schema including separate fields for (i) desired output data schema and (ii) business information and contextual parameters to be supplied to different agents for execution of the discrete tasks, wherein the target data schema specifies a structure and attributes of the synthetic data.

6. The system of claim 1, wherein the plurality of autonomous agents further includes a validation tool that applies statistical and structural analyses to ensure that the generated synthetic data meets predefined standards of coverage, variety, and fidelity.

7. The system of claim 1, wherein the orchestrator agent operates as a stateful controller that performs capacity planning to determine which agents are required, in what order, and which can run concurrently when the plurality of autonomous agents complete the discrete tasks.

8. The system of claim 1, wherein the first intermediate output is an enriched inputs JSON artifact annotated with provenance metadata and relevance scores.

9. The system of claim 1, wherein the second intermediate output is a structured variations JSON artifact specifying variation types, frequency parameters, and distribution weights.

10. The system of claim 1, wherein the plurality of autonomous agents further include an artifact serializer/loader that externalizes the first intermediate output and the second intermediate output to avoid context-window limitations of large language models.

11. The system of claim 1, wherein the data generation agent invokes one or more of a text generation model, an image generation model, or a video generation model to create one or more of a text dataset, an image dataset, or a video dataset in the electronic data generation process.

12. A system for dynamically generating synthetic data, including a memory and one or more processors, wherein the memory stores a computer program executable by the one or more processors, and when executing the computer program, the one or more processors are configured to perform:

receiving, via a human-in-the-loop interface, input comprising a target data schema for an electronic data generation process;

transmitting the received input to an orchestrator agent configured to decompose the electronic data generation process into discrete tasks and determine an execution strategy based on the discrete tasks; and invoking, according to the execution strategy, a plurality of autonomous agents to complete the discrete tasks to generate the synthetic data, wherein the plurality of autonomous agents includes:

an input enrichment agent that broadens a number and types of input parameters associated with the received input to generate a first intermediate output;

a variability injection agent that introduces controlled complexity to the received input to generate a second intermediate output; and a data generation agent that generates the synthetic data conforming to the target data schema by integrating one or more of the first intermediate output and the second intermediate output into the electronic data generation process, wherein the plurality of autonomous agents further includes a human-in-the-loop agent that transforms the input, received via the human-in-the-loop interface, into a structured schema in JSON format, the structured schema including separate fields for (i) desired output data schema and (ii) business information and contextual parameters to be supplied to different agents for execution of the discrete tasks, wherein the target data schema specifies a structure and attributes of the synthetic data, and wherein the human-in-the-loop agent defaults to a domain-agnostic mode when no seed data is included in the received input.

13. A system for dynamically generating synthetic data, including a memory and one or more processors, wherein the memory stores a computer program executable by the one or more processors, and when executing the computer program, the one or more processors are configured to perform:

receiving, via a human-in-the-loop interface, input comprising a target data schema for an electronic data generation process;

transmitting the received input to an orchestrator agent configured to decompose the electronic data generation process into discrete tasks and determine an execution strategy based on the discrete tasks; and invoking, according to the execution strategy, a plurality of autonomous agents to complete the discrete tasks to generate the synthetic data, wherein the plurality of autonomous agents includes:

an input enrichment agent that broadens a number and types of input parameters associated with the received input to generate a first intermediate output;

a variability injection agent that introduces controlled complexity to the received input to generate a second intermediate output; and a data generation agent that generates the synthetic data conforming to the target data schema by integrating one or more of the first intermediate output and the second intermediate output into the electronic data generation process, wherein the plurality of autonomous agents further includes a validation tool that applies statistical and structural analyses to ensure that the generated synthetic data meets predefined standards of coverage, variety, and fidelity, and wherein the validation tool further outputs a structured feedback report used by the orchestrator agent to re-engage the input enrichment agent or the variability injection agent for refinement.

14. A computer-implemented method for dynamically generating synthetic data, the method comprising:

receiving, via a human-in-the-loop interface, input comprising a target data schema for an electronic data generation process;

transmitting the received input to an orchestrator agent configured to decompose the electronic data generation process into discrete tasks and determine an execution strategy based on the discrete tasks; and invoking, according to the execution strategy, a plurality of autonomous agents to complete the discrete tasks to generate the synthetic data, wherein the plurality of autonomous agents includes:

an input enrichment agent that broadens a number and types of input parameters associated with the received input to generate a first intermediate output;

a variability injection agent that introduces controlled complexity to the received input to generate a second intermediate output; and a data generation agent that generates the synthetic data conforming to the target data schema by integrating one or more of the first intermediate output and the second intermediate output into the electronic data generation process, wherein the plurality of autonomous agents further includes an artifact serializer/loader that externalizes the first intermediate output and the second intermediate output to avoid context-window limitations of large language models.

15. The method of claim 14, wherein the received input further includes seed data, and the plurality of autonomous agents further includes a topic modeling agent configured to perform topic modeling and categorization on the seed data and relevant context for the electronic data generation process, so as to extract hierarchical structures of categories and keywords relevant to the target data schema.

16. The method of claim 15, wherein the data generation agent generates the synthetic data conforming to the target data schema by integrating one or more of the first intermediate output, the second intermediate output, and hierarchical structures of categories and keywords from the first intermediate output and the second intermediate output and relevant to the target data schema.

17. The method of claim 14, wherein the plurality of autonomous agents further includes a human-in-the-loop agent that transforms the input, received via the human-in-the-loop interface, into a structured schema in JSON format, the structured schema including separate fields for (i) desired output data schema and (ii) business information and contextual parameters to be supplied to different agents for execution of the discrete tasks, wherein the target data schema specifies a structure and attributes of the synthetic data.

18. The method of claim 14, wherein the plurality of autonomous agents further includes a validation tool that applies statistical and structural analyses to ensure that the generated synthetic data meets predefined standards of coverage, variety, and fidelity.

19. The method of claim 18, further comprising using the synthetic data to train a machine learning model in combination with a limited set of real data.

* * * * *